United States Patent
Chiueh et al.

(10) Patent No.: US 8,881,145 B2
(45) Date of Patent: Nov. 4, 2014

(54) SYSTEM AND METHOD FOR GENERATING APPLICATION-LEVEL DEPENDENCIES IN ONE OR MORE VIRTUAL MACHINES

(75) Inventors: Tzi-Cker Chiueh, Taipei (TW); Hao-Cheng Lin, Taoyuan County (TW)

(73) Assignee: Industrial Technology Research Institute, Hsinchu (TW)

(*) Notice: Subject to any disclaimer, the term of this patent is extended or adjusted under 35 U.S.C. 154(b) by 268 days.

(21) Appl. No.: 13/327,407

(22) Filed: Dec. 15, 2011

(65) Prior Publication Data
US 2013/0159999 A1   Jun. 20, 2013

(51) Int. Cl.
*G06F 9/455* (2006.01)

(52) U.S. Cl.
CPC .................. *G06F 9/45533* (2013.01)
USPC .............. 718/1; 709/223; 709/224; 709/226; 719/317; 719/318

(58) Field of Classification Search
USPC ............. 370/389, 395.41; 709/224, 223; 712/227; 717/127, 136, 177; 718/1, 718/100; 719/319; 726/23
See application file for complete search history.

(56) References Cited

U.S. PATENT DOCUMENTS

| | | | |
|---|---|---|---|
| 4,780,821 A * | 10/1988 | Crossley | 718/100 |
| 6,182,136 B1 * | 1/2001 | Ramanathan et al. | 709/224 |
| 6,526,501 B2 * | 2/2003 | Edwards et al. | 712/227 |
| 6,912,522 B2 * | 6/2005 | Edgar | 1/1 |
| 7,509,330 B2 * | 3/2009 | Ewing et al. | 1/1 |
| 7,552,447 B2 | 6/2009 | Uthe | |
| 7,697,545 B1 | 4/2010 | O'Sullivan | |
| 7,779,126 B1 * | 8/2010 | Cheriton | 709/226 |
| 7,782,869 B1 * | 8/2010 | Chitlur Srinivasa | 370/395.41 |
| 7,843,912 B2 * | 11/2010 | Harris et al. | 370/389 |
| 8,028,071 B1 * | 9/2011 | Mahalingam et al. | 709/227 |
| 8,046,456 B1 | 10/2011 | Miller et al. | |
| 8,341,627 B2 * | 12/2012 | Mohinder | 718/1 |
| 2003/0023712 A1 * | 1/2003 | Zhao et al. | 709/223 |
| 2004/0177141 A1 * | 9/2004 | Foody et al. | 709/224 |
| 2005/0216895 A1 * | 9/2005 | Tran | 717/127 |
| 2006/0130016 A1 * | 6/2006 | Wagner | 717/136 |
| 2008/0016570 A1 * | 1/2008 | Capalik | 726/23 |
| 2008/0155537 A1 * | 6/2008 | Dinda et al. | 718/1 |
| 2008/0184273 A1 * | 7/2008 | Sekar | 719/319 |
| 2009/0024994 A1 * | 1/2009 | Kannan et al. | 718/1 |
| 2009/0178037 A1 * | 7/2009 | Winter et al. | 718/1 |
| 2010/0030893 A1 | 2/2010 | Berg et al. | |
| 2010/0223609 A1 * | 9/2010 | Dehaan et al. | 717/177 |
| 2010/0235836 A1 * | 9/2010 | Bratanov | 718/1 |
| 2010/0325707 A1 | 12/2010 | Iverson et al. | |
| 2011/0126195 A1 * | 5/2011 | Tsirkin | 718/1 |
| 2011/0276684 A1 * | 11/2011 | Singh et al. | 709/224 |
| 2012/0210318 A1 * | 8/2012 | Sanghvi et al. | 718/1 |

OTHER PUBLICATIONS

Azab, Ahmed M. et al., "HIMA: A Hypervisor-Based Integrity Measurement Agent", Dec. 7, 2009, CiteSeerX.*

(Continued)

*Primary Examiner* — Lewis A Bullock, Jr.
*Assistant Examiner* — Gilles Kepnang
(74) *Attorney, Agent, or Firm* — Rabin & Berdo, P.C.

(57) ABSTRACT

A technique generates application-level dependencies in one or more virtual machines (VMs). An intercepting module in a VM monitor intercepts a guest operation system (OS) at TCP send and close related operations. An introspecting module in the VM monitor performs VM introspection for TCP connection and thread information by checking running thread and processing socket kernel objects. It generates an application trajectory and exports application dependencies from the application trajectory for a selected application.

26 Claims, 20 Drawing Sheets

(56) References Cited

OTHER PUBLICATIONS

Chen, Xu et al., "Automating Network Application Dependency Discovery: Experiences, Limitations, and New Solutions", 2008, OSDI'08—Proceedings of the 8th USENIX conference on Operating systems Design and ImplementationKim.*
Myung-Sup et al., "Application-Level Traffic Monitoring and an Analysis on IP Networks", Feb. 2005, ETRI Journal.*
Mitchem, Terrence et al., "Using Kernel Hypervisors to Secure Applications", 1997, IEEE.*
Rubanov, Vladimir V. et al., "Runtime Verification of Linux Kernel Modules Baed on Call Interception", Mar. 21, 2011, IEEE.*
Ando, Ruo et al. "A Lightweight Access Log Filter of Windows OS Using Simple Debug Register Manipulation." 2011. Security Technology. Springer Berlin Heidelberg. p. 215-227.*
Azmandian, Fatemeh et al. "Virtual machine monitor-based lightweight intrusion detection." 2011. ACM SIGOPS Operating Systems Review 45.2. p. 38-53.*
Beck, Frédéric et al. "Syscall interception in xen hypervisor." 2009.*
Gu, Zhongshu et al. "Process implanting: A new active introspection framework for virtualization." 2011. Reliable Distributed Systems (SRDS), 2011 30th IEEE Symposium on. IEEE.*
Kim, Kangho, et al. "Inter-domain socket communications supporting high performance and full binary compatibility on Xen." 2008. Proceedings of the fourth ACM SIGPLAN/SIGOPS international conference on Virtual execution environments. ACM.*
Luo, Cheng, et al. "A Functional Classification based inter-VM Communication Mechanism with multi-core platform." 2009. Parallel and Distributed Systems (ICPADS), 2009 15th International Conference. IEEE.*
Pfoh, Jonas et al. "Exploiting the x86 architecture to derive virtual machine state information." 2010. Emerging Security Information Systems and Technologies (Securware), 2010 Fourth International Conference. IEEE.*
Automating Network Application Dependency Discovery: Experiences, Limitations, and New Solutions. In OSDI'08 Proceedings of the 8th USENIX conference on Operating systems design and implementation. 2008.
Ether: malware analysis via hardware virtualization extensions. In CCS '08 Proceedings of the 15th ACM conference on Computer and communications security. CCS'08, Oct. 27-31, 2008, Alexandria, Virginia, USA.
X-Trace: A Pervasive Network Tracing Framework. In NSDI'07 Proceedings of the 4th USENIX conference on Networked systems design & implementation, Appears in the 4th USENIX Symposium on Networked Systems Design & Implementation (NSDI'07), Apr. 2007.
Collecting Provenance via the Xen Hypervisor. In Tapp'11 USENIX Workshop on the Theory and Practice of Provenance, Jun. 20, 2011.
XenAccess: An Introspection Library for Xen, Bryan D. Payne, College of Computing, Georgia Institute of Technology, Feb. 5, 2006.

* cited by examiner

SYSTEM AND METHOD FOR GENERATING APPLICATION-LEVEL DEPENDENCIES IN ONE OR MORE VIRTUAL MACHINES

TECHNICAL FIELD

The disclosure generally relates to a system and method for generating application-level dependencies in one or more virtual machines.

BACKGROUND

Enterprise services were usually composed of large number of service servers and/or networks. As evolving of network growth and matured computation virtualization techniques, enterprise applications become more complex. For example, more user applications are moved from a personal computer into a virtual data center (VDC) due to cloud computing, end-users use the remote application by requesting services provided by data center's service server. Distributed applications become more powerful and comprehensive. A single node's performance problem or failure may affect whole distributed system's quality of service (QoS). Compared with hardware failure or resource exhaustion, software problem is hard to detect. Therefore, distributed applications' performance management is desired.

One of current technologies for application discovery is by monitoring application events. This technology installs an agent on each physical server. The agent monitors events reported by applications, and forwards events to a central application management server. The application management server, then, analyzes the application events in a data center, discoveries applications running on the data center, and finds dependency between applications.

One of current technologies for application dependency discovery is instrumenting the middle ware software of Java byte-code. The instrumented codes track requests pass through the middleware and send the tracking logs to a central application management server. Then the application management server analyzes these logs, knows messages exchanges between applications, and discovery dependencies between applications. This technology works on distributed applications communicated through the instrumented middleware.

One of current technologies for application dependency discovery is sniffing the network traffic on each physical server. This technology installs an agent on every physical server to sniff network traffic to/from this server and sends the traffic logs to a central application server. The application server analyzes these traffic logs and generates application dependencies between physical servers. FIG. 1 shows an example of generated application dependencies by sniffing network traffic on every physical server. In the example, an exchange client application connects to one server through well-known Domain Name System (DNS) port 53, connects to another server through well-known Active Directory (AD) port 88, 135, 1024, 389, and connects to another server through well-known MAILBOX port 135. The application dependency map of the exchange client application may be generated as shown in FIG. 1.

Background for the terms of application, process and thread may be described as follows. An application is executable computer software running on either physical machines or virtual machines (VMs). An application may create one or more processes in the operating system (OS). A process is a basic unit of an execution environment in the OS to run user applications. This execution environment allocates resources from the OS, and owns the resources, thus threads running in the process could share these resources. The resources may include memory, open file's descriptors, open network connections, etc. A thread is a basic unit of execution control in a computer system. There may be one or more threads running in one process's execution environment. One application may create many processes to provide services on the physical server, and each process may create one or more concurrent threads that share resources owned by this process. The applications that create many processes with one single thread at each process are called multi-process applications. The applications that create many concurrent threads in one process are multi-thread applications.

SUMMARY

The exemplary embodiments of the present disclosure may provide a system and method for generating application-level dependencies in one or more virtual machines.

One exemplary embodiment relates to a system for generating application-level dependencies in one or more virtual machines (VMs). The system comprises an application performance management (APM) server running on a physical machine, one or more intercepting modules, and one or more introspecting modules. The APM server accepts a request and send a command to at least one forward daemon to turn on inspect status of at least one related VM of the one or more VMs, and generates an application trajectory of a selected application and export application dependencies for the selected application. Each intercepting module intercepts a guest operation system (OS) at transmission control protocol (TCP) send and closely-related operations on the at least one related VM. Each introspecting module performs VM introspection for TCP connection and running thread information.

Another exemplary embodiment relates to a computer-implemented method for generating application-level dependencies in one or more virtual machines (VMs). The method comprises: under control of one or more physical servers that provide a virtual environment having said one or more VMs; intercepting a guest operation system (OS) at transmission control protocol (TCP) send and closely-related operations of at least one related VM of the one or more VMs; performing VM introspection for TCP connection and running thread information; and generating an application trajectory of a selected application and exporting application dependencies from the application trajectory for the selected application.

The foregoing and other features and aspects of the disclosure will become better understood from a careful reading of a detailed description provided herein below with appropriate reference to the accompanying drawings.

DETAILED DESCRIPTION OF THE EXEMPLARY EMBODIMENTS

The exemplary embodiments disclose a technique for using VM inspection to generate application-level dependencies in a virtualization environment. The VM inspection may be performed by intercepting VM execution and introspecting VM states. The technique intercepts guest OS's at packet sending system call, performs VM introspection to get running thread and TCP connection information, and sends this traffic log to servers. The thread-based traffic log is further converted into an inter-thread traffic log in an application performance management (APM) server. From inter-thread traffic logs, two kinds of outputs may be generated. One output is application trajectory in thread granularity, and the other output is an accurate application dependency map from the application trajectory.

Figure 1:
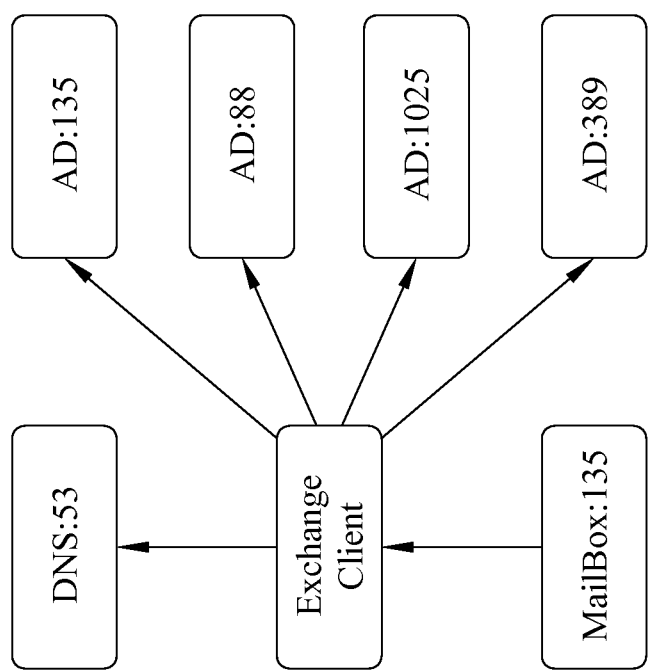
FIG. 1 shows an example of generated application dependencies by sniffing network traffic on every physical server.
Figure 2A:
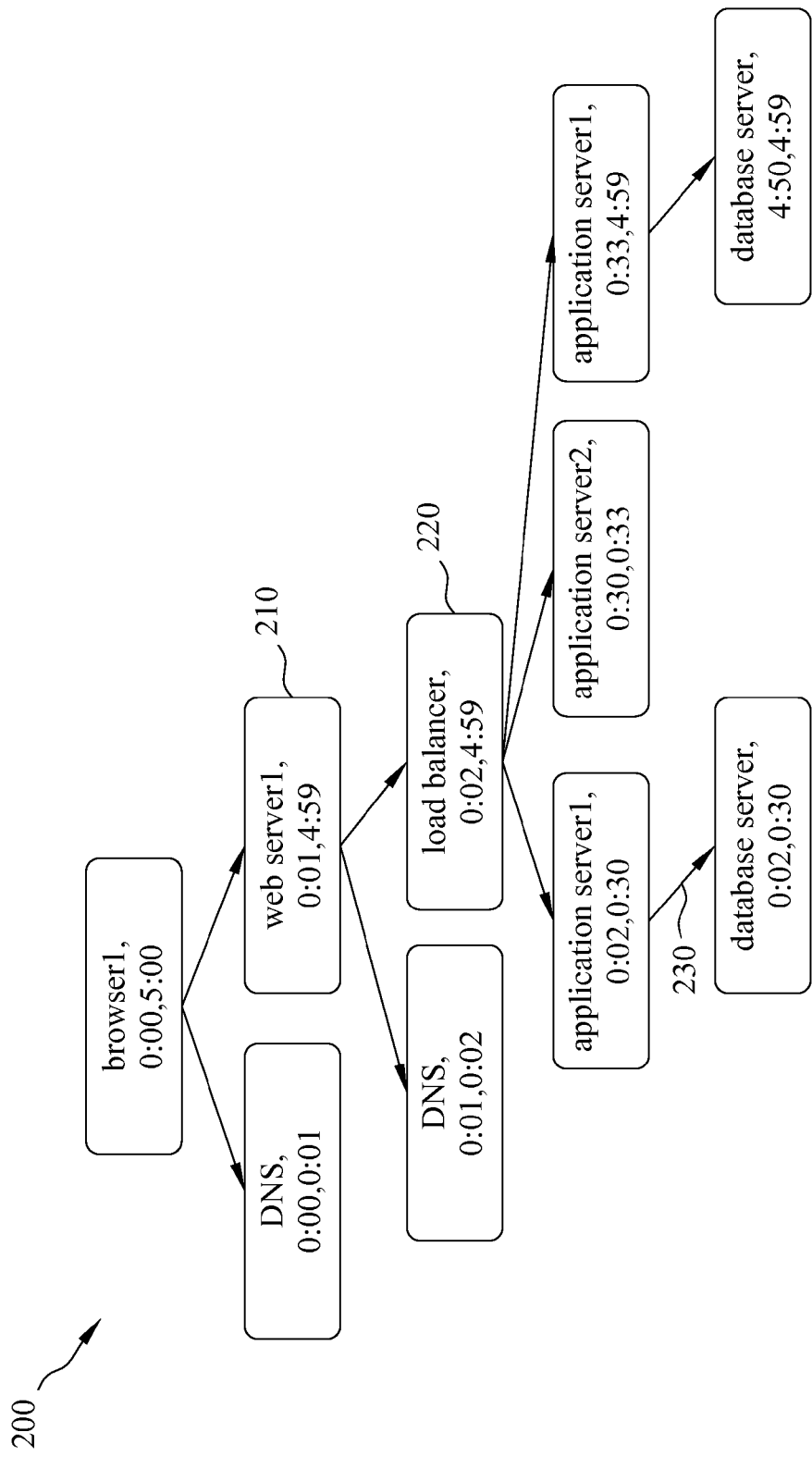
FIG. 2A shows an example of an application trajectory, according to an exemplary embodiment.

An application trajectory is composed of a list of message exchanges between applications at its occurred time. An application trajectory may include messages directly sent by this application and messages indirectly sent by other applications for processing messages sent by this application. The application trajectory may be stored in a tree data structure. The application trajectory may comprise one or more nodes, one or more links, and one or more arrows. FIG. 2A shows an example of an application trajectory according to an exemplary embodiment. Referring to FIG. 2A, the application trajectory 200 starts from browser 1. A node in the trajectory indicates a message exchange to an application during a time period. For example, a node 210 indicates message exchange to application named web server1 during the time period with start time 0:01 and end time 4:59. A link in the trajectory indicates a direct message exchange between two applications. For example, a link between nodes 210 and 220 indicates a direct message exchange between the application named web server1 and the application named load balancer. An arrow in the trajectory indicates the direction of a connection between two applications, from client application to server application, e.g., arrow 230 indicates a client side (application server 1, 0:33, 4:59) to a server side (database server, 4:50, 4:59) connection. The application trajectory may help the administrator to find out bottlenecks of application performances. For example, when the message response time of the database server to application server 1 is very long, it will indirectly affect the user's execution performance on browser 1. By looking into the trajectory information, it may be found the duration of which application's message exchange is too long. An application dependency map may further inform the administrator of which dependency relation is very slow by a graphic display.

Figure 2C:
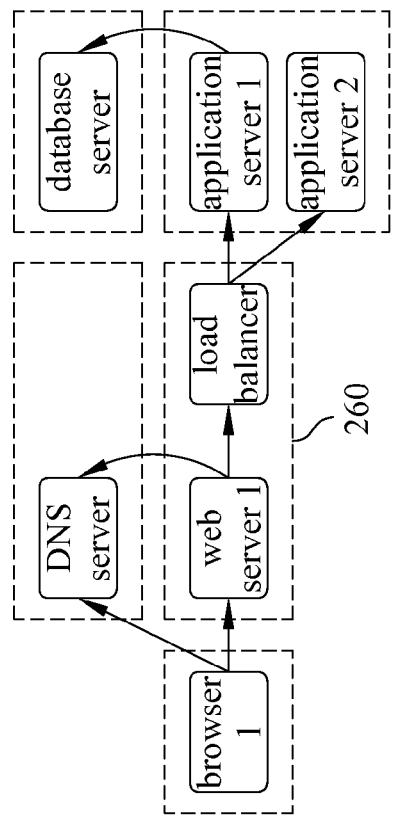
FIG. 2C shows an example of an application dependency map with VM information, according to an exemplary embodiment.
Figure 2B:
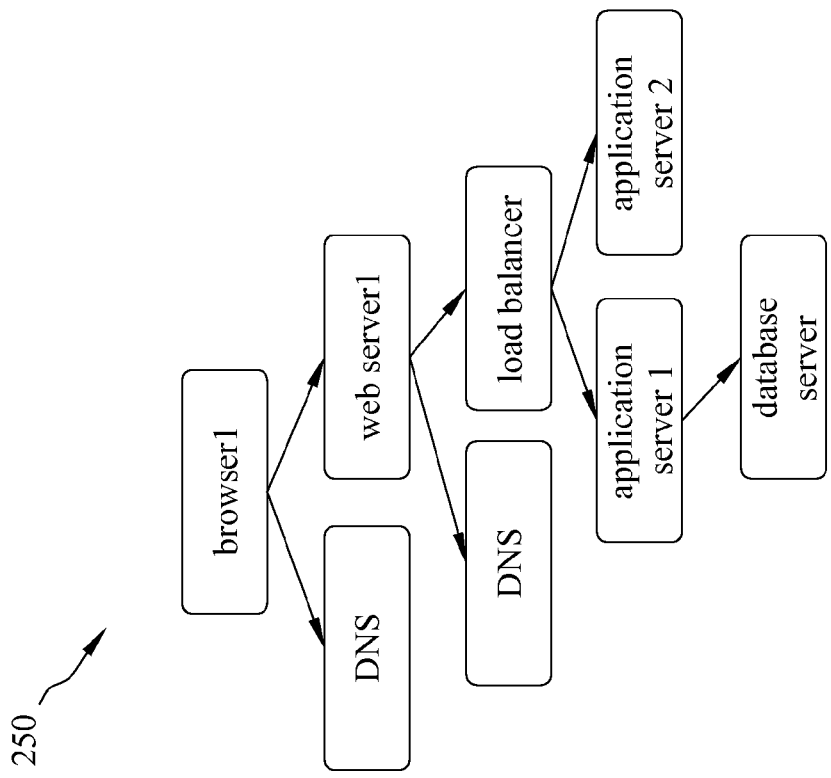
FIG. 2B shows an example of an application dependency map, according to an exemplary embodiment.

The application dependency map records dependency between applications. FIG. 2B shows an example of an application dependency map according to an exemplary embodiment. Referring to FIG. 2B, the application dependency map 250 starts from browser 1. In the application dependency map 250, if application A has data exchange with application B and A is client side of A to B connection, then A depends on B. For example, if load balancer (application A) has data exchange with application server 2 (application B), then load balancer depends on application server 2. Application dependency map is equivalent to static view of trajectory. Information of virtual machine or physical machine may be added onto an application dependency map to help understanding of application deployment. The exemplary embodiments may associate VM kernel information to generate the application dependency map in a virtualization environment. FIG. 2C shows a schematic view of the application dependency map of FIG. 2B with VM information thereon. Wherein a dashed line block indicates a VM in a virtualization environment and a VM may comprise one or more members. For example, web server 1 and load balancer lie in a same VM 260 and there are five VMs in the virtualization environment.

Figure 3A:
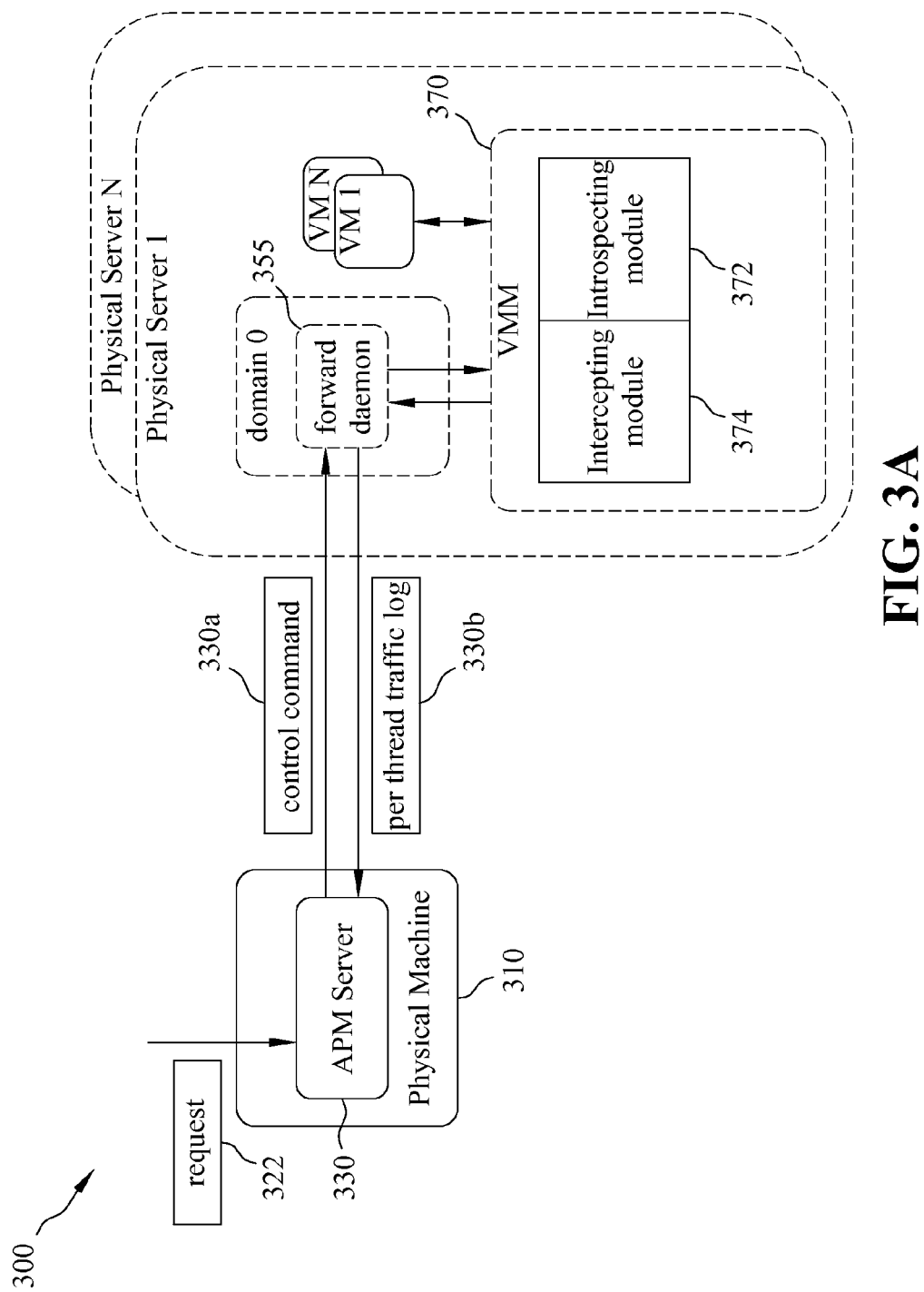
FIG. 3A shows a schematic view of a system for generating application-level dependencies in one or more virtual machines, according to an exemplary embodiment.

FIG. 3A shows a schematic view of a system for generating application-level dependencies in one or more virtual machines (VMs), according to an exemplary embodiment. Referring to FIG. 3A, a system 300 comprises an application performance management (APM) server 330 running on a physical machine 310, one or more intercepting modules, and one or more introspecting modules. The APM server 330 accepts a request 322 and send a control command 330a to at least one forward daemon 355 to turn on inspect status of at least one related VM of the one or more VMs such as VM1~VM N, and generates an application trajectory of a selected application and export application dependencies for the selected application. Each intercepting module such as intercepting module 374 intercepts a guest operation system (OS) at transmission control protocol (TCP) send and closely-related operations on the all related VMs. Each introspecting module such as introspecting module 372 performs VM introspection for TCP connection and running thread information by checking the guest OS's running kernel data structure and getting one or more running thread's process and thread information, and generates one or more per-thread traffic logs 330b for sending to the APM server via the forward daemon 355. Intercepting module 374 and introspecting module 372 are in a corresponding VM monitor (VMM) such as VMM 370 on a corresponding physical server such as physical server 1, and a corresponding forward daemon 355 is running on the corresponding physical server 1.

Figure 3B:
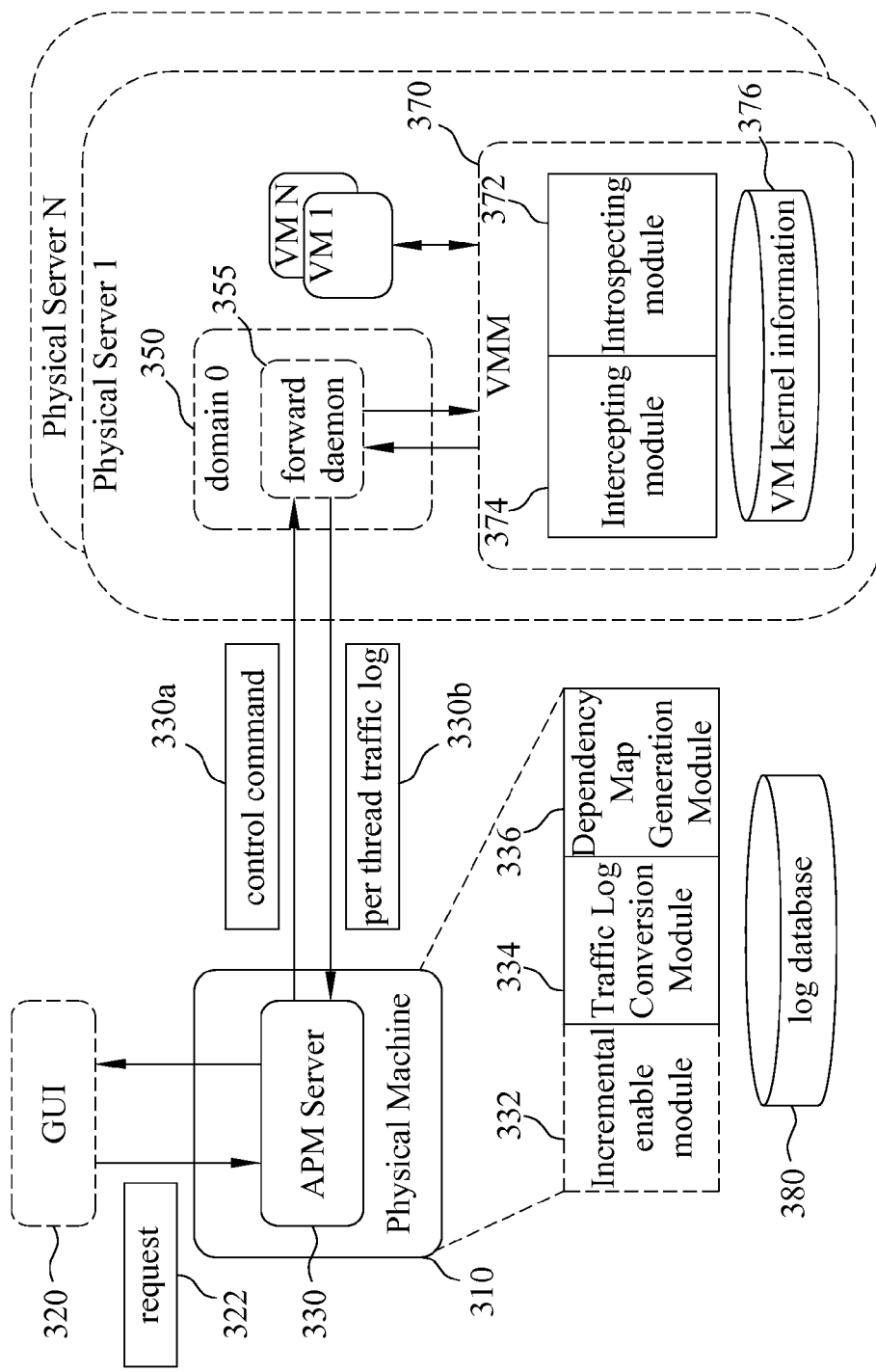
FIG. 3B shows an exemplary environment illustrating the detailed operation of the system of FIG. 3A, according to an exemplary embodiment.

FIG. 3B shows an exemplary environment illustrating the detailed operation of the system of FIG. 3A, according to an exemplary embodiment. In the environment, the APM server 330 may receive the request 322 from an administrator through a graphic user interface (GUI) 320 to start the application dependency generation. The request 322 may contain at least one selected application and a related vm-id list. The selected application is an application to be identified application dependency, which may carry the information such as at least one application name and its running VM's VM identification (vm-id); the related vm-id list represents a list of VMs that are related to the selected application and needed to enable VM inspection. On receiving the request, the APM server sends control command 330a to one or more forward daemons on one or more physical servers that run VMs related to the selected application. The control command may contain turn on/off inspection feature and corresponding vm-id. Each forwarding daemon transfers the control command to a corresponding VMM. For a VM with an inspecting status on, for example VMM 370, VM intercepting module 374 intercepts its execution at TCP send and closely-related functions, and VM introspecting module 372 checks kernel data structure and get running thread and TCP connection information. The introspecting module 372 generates one per-thread traffic log for each calling to TCP related functions in VMs. The per-thread traffic logs are sent to forward daemon 355 for forwarding per-thread traffic 330b to the APM server 330. By analyzing the received logs, the APM server 330 may send an output 324 to the administrator through the GUI 320. The output may comprise at least one application trajectory and an application dependency map of the selected application.

The VM kernel information 376 in the VMM 370 may comprise TCP operation intercept information and kernel object definition. The TCP send intercept information is information needed to intercept the TCP send and TCP closely-related operations. It may be TCP send and closely-related function's addresses or TCP send closely-related system call numbers in an embodiment. After receiving the turn on inspection command, the intercepting module 374 loads the intercept information from VM kernel information 376 and starts intercepting at TCP send and closely-related operations. After it successfully intercepts at TCP operations, the system 300 may begin to perform traffic log collection in introspecting module 372.

Introspecting module 372 is configured to perform VM introspection for thread and TCP connection information. The introspecting module 372 may check the VM's CPU register values, get kernel objects of running thread and processing socket and generate the per-thread traffic log. It receives kernel object definition from VM kernel information 376. The kernel object definition includes definition for process, thread and socket objects. The introspecting module 372 uses the kernel object definition to interpret values in the thread and socket objects to generate the per-thread traffic log. Each per-thread traffic log collected by the introspecting module 372 may at least contain information such as time information, thread information, connection information, direction, etc. After generating the per-thread traffic log, the introspecting module 372 outputs each per-thread traffic log to the forward daemon 355 that forwards the per-thread traffic log 330b to the APM server 330.

The APM server 330 may further include a traffic log conversion module 334 and a dependency map generation module 336. With each per-thread traffic log, the traffic log conversion module 334 performs a conversion from per-thread traffic log into inter-thread traffic log by finding destination thread of each per-thread traffic log, and stores each inter-thread traffic log to a log database 380. The dependency map generation module 336 reads inter-thread traffic log from log database 380. Each inter-thread traffic log may contain information such as time, sender/receiver thread info, direction, etc. The APM server 330 may use an incremental enable module 332 to gradually enables related VM's inspect status until the at least one related VM's inspect status is turn on.

From all of the inter-thread traffic logs, the dependency map generation module 336 generates an application trajectory by a generation application trajectory (GAT) algorithm. And, from the application trajectory, it generates accurate application dependencies during a time period by a generation application dependency (GAD) algorithm, and exports the accurate application dependencies for the selected application. The application trajectory may be stored, such as in a tree data structure. The GAD algorithm may generates application dependency map from the application trajectory and by recursively calling a GAD subroutine.

Figure 4:
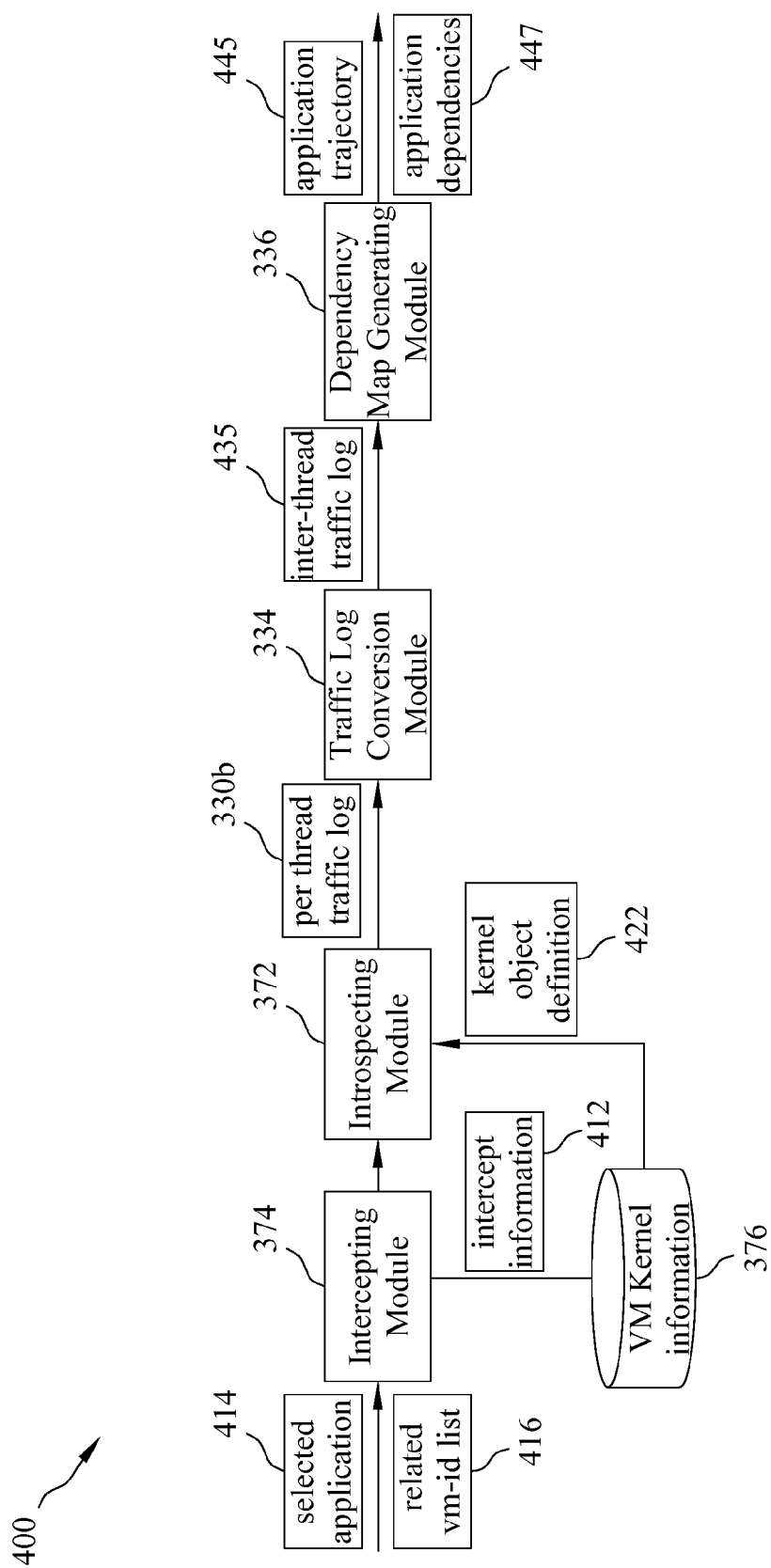
FIG. 4 shows a schematic view of a data flow for generating application-level dependencies in a virtualization environment, according to an exemplary embodiment.

FIG. 4 shows a data flow of system 300 for generating application trajectory and dependencies. An administrator inputs a selected application 414 and a related vm-id list 416 into the system. The intercepting module 374 loads intercept information 412 from VM kernel information 376 and starts to inspect on the related VM. When guest VM is intercepted, the introspecting module 372 loads the kernel object definition 422 from VM kernel information, reads the kernel objects in guest VM for getting thread and TCP connection information and generates per-thread traffic log 330b to traffic log conversion module 334. The traffic log conversion module 334 converts per-thread traffic log 330b into inter-thread traffic log 435 and outputs to dependency map generation module 336. The dependency map generation module 336 generates application trajectory 445, then generate application dependency 447 and outputs to the administrator.

In one instance, the administrator may not know exactly related VMs of the selected application and have to enable every VM's inspection status in the VDC for generating application dependency. The exemplary embodiments use a three-phase scheme to find related VMs of selected application thus reduce the number of generated traffic logs and the cost of dependencies generation.

Figure 5:
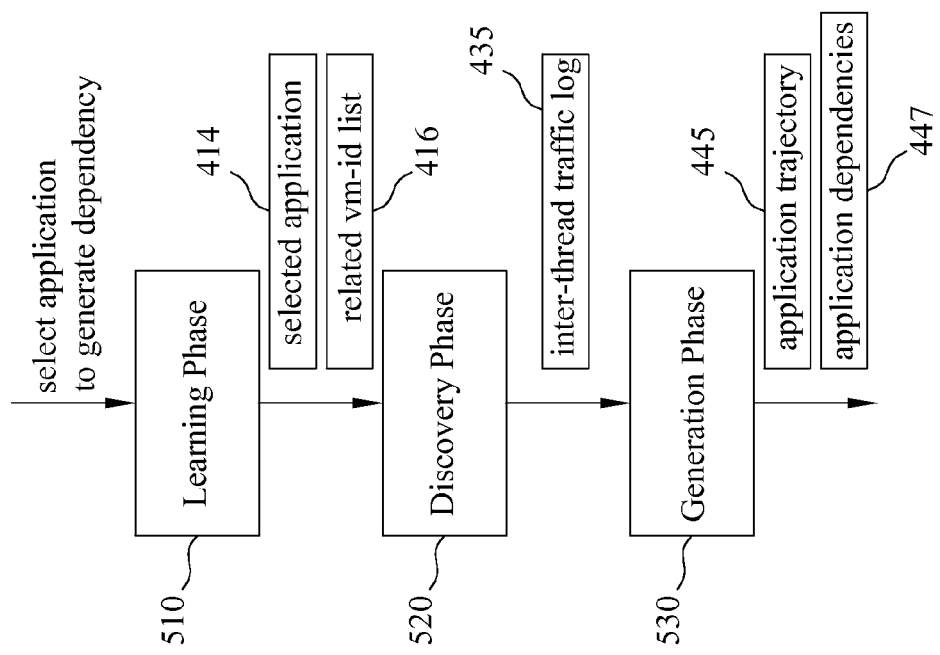
FIG. 5 shows a schematic view of a three-phase scheme, according to an exemplary embodiment.

FIG. 5 shows a schematic view of a three-phase scheme according to an exemplary embodiment. Referring to FIG. 5, the three phases include a learning phase 510, a discovery phase 520, and a generation phase 530. Learning phase 510 identifies VMs related to an application. Only related VMs are enabled VM inspection in the discovery phase 520. This will reduce the number of VMs needed to inspect. In the learning phase 510, a selected application to generate dependencies is inputted, and an incremental approach is used to enable the related VMs' inspection feature until no new related VM is found. The output of the learning phase 510 is the selected application 414 and the related vm-id list 416 for the application, and further sent to the discovery phase 520. According to the application and its related vm-id list, thread-based traffic logs are collected and inter-thread traffic log 435 is generated in the discovery phase 520. The inter-thread traffic log 435 is further sent to the generation phase 530. In the generation phase 530, the application trajectory 445 and the application dependencies 437 are generated.

Figure 6:
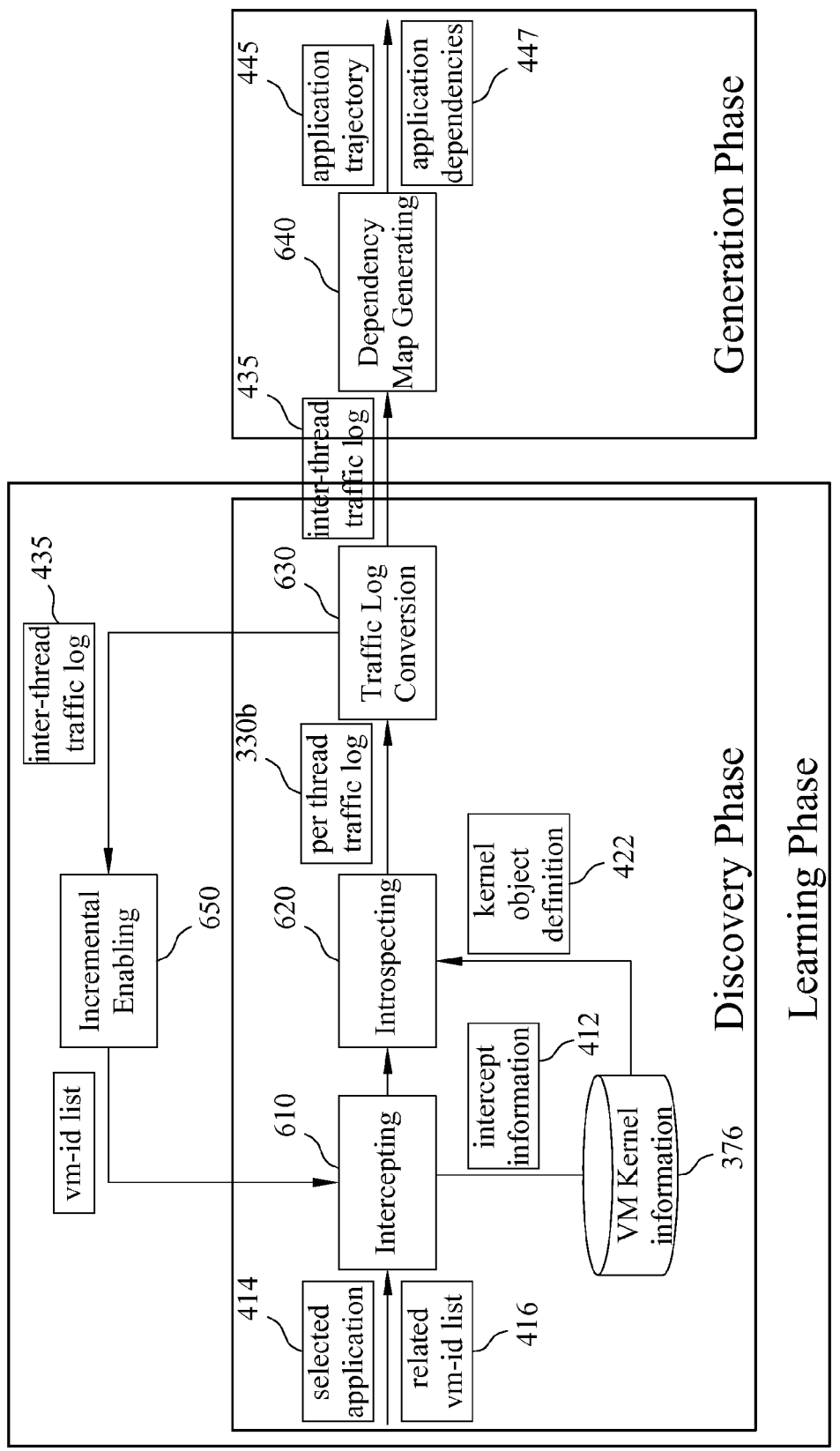
FIG. 6 shows the three phases of FIG. 5 with a method for generating application-level dependencies in a virtualization environment, according to an exemplary embodiment.

Therefore, according to the exemplary embodiment of FIG. 4, the three phases with a computer-implemented method for generating application-level dependencies in a virtualization environment may be shown as FIG. 6. In FIG. 6, the discovery phase 520 includes the steps of intercepting 610, introspecting 620 and traffic log conversion 630. Intercepting 610 performs the operations of intercepting module 374. Introspecting 620 performs the operations of introspecting module 372. And, traffic log conversion 630 performs the operations of traffic log conversion module 334. The generation phase 530 includes a step of dependency map generating 640, and the dependency map generating 640 performs the operations of dependencies generation module 336. The learning phase 510 includes a step of incremental enabling 650. The incremental enabling 650 incrementally enables VM traffic logging by using the inter-thread traffic log 435 from the traffic log conversion 630, and outputs a vm-id list 416 to discovery phase 520.

Accordingly, a computer-implemented method for generating application-level dependencies in one or more virtual machines may comprise intercepting 610, introspecting 620, traffic log conversion 630 and dependency map generating 640. In other words, under control of one or more physical servers that provide a virtual environment having said one or more VMs, the computer-implemented method intercepts a guest operation system (OS) at transmission control protocol (TCP) send and closely-related operations of at least one related VM of the one or more VMs, performs VM introspection for TCP connection and running thread information by checking the guest OS's running threads and getting one or more running threads and TCP connection information, generates one or more per-thread traffic logs, then converts the one or more per-thread traffic logs to one or more inter-thread traffic logs, generates an application trajectory from the one or more inter-thread traffic logs, and exports application dependencies from the application trajectory for a selected application.

Figure 7:
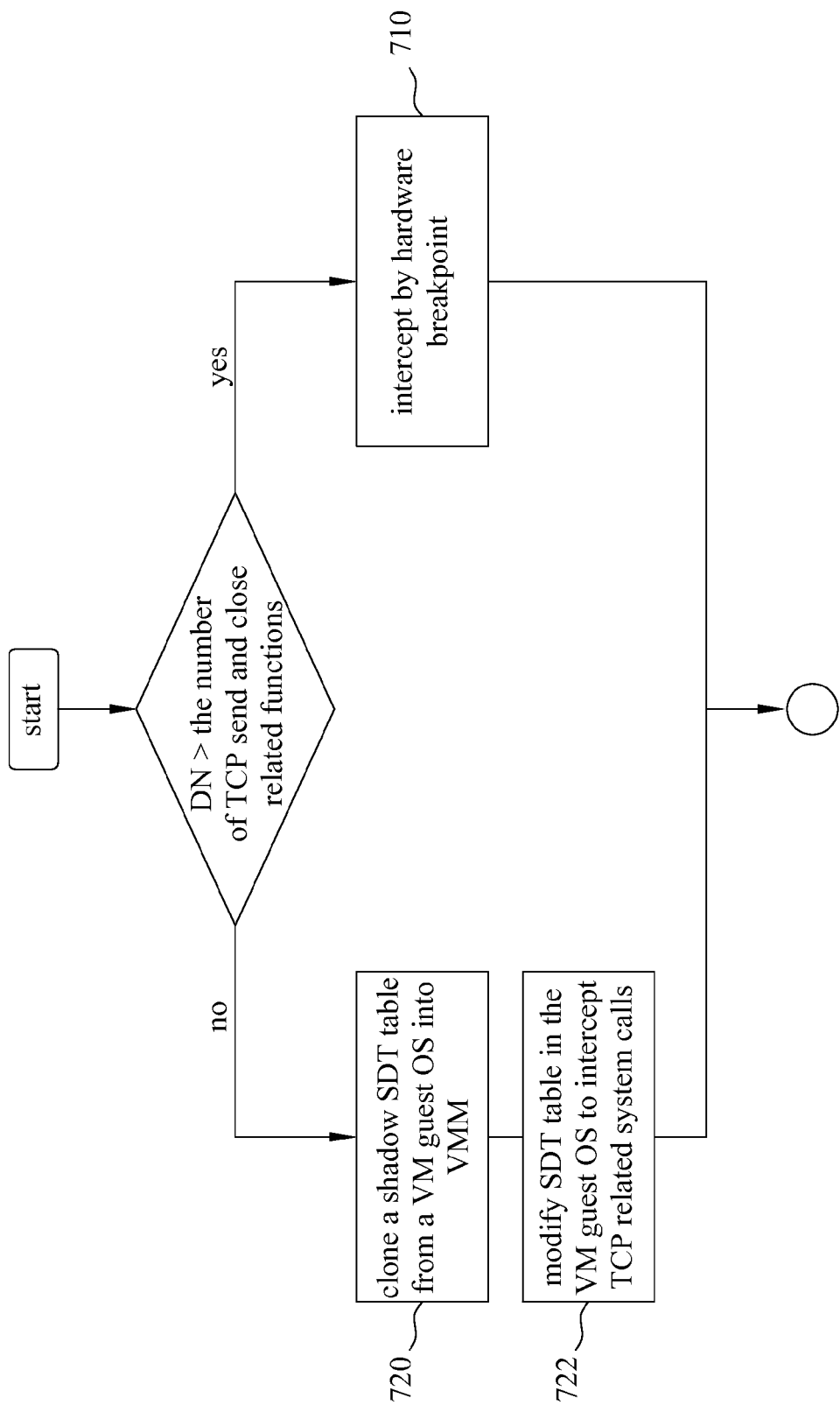
FIG. 7 is a flow chart showing decisions to select intercept mechanism, according to an exemplary embodiment.

The disclosed exemplary embodiments for generating application-level dependencies in a virtualization environment run at multi-process models such as apache pre-fork model or multi-thread models such as apache worker model, or both. In some embodiments, intercepting 610 may be implemented with either intercepting by hardware breakpoint or intercepting TCP related system calls, but not limited to these. FIG. 7 is a flow chart showing decisions to select intercept mechanism, according to an exemplary embodiment. In an exemplary embodiment, the decision to select intercept mechanism may depend on the number DN of hardware debug registers supported by a CPU and the number of TCP send and closely-related functions in the guest OS. As shown in FIG. 7, when the number DN is greater than the number of TCP send and closely-related functions, intercepting by hardware breakpoint is selected, as shown in step 710. When the number DN is not greater than the number of TCP send and closely-related functions, intercepting by TCP related system calls is selected, which includes cloning a shadow service descriptor table (SDT) table from a VM guest OS into a VM monitor (VMM) (step 720) and modifying SDT table in the VM guest OS to intercept TCP related system calls (step 722).

Figure 8:
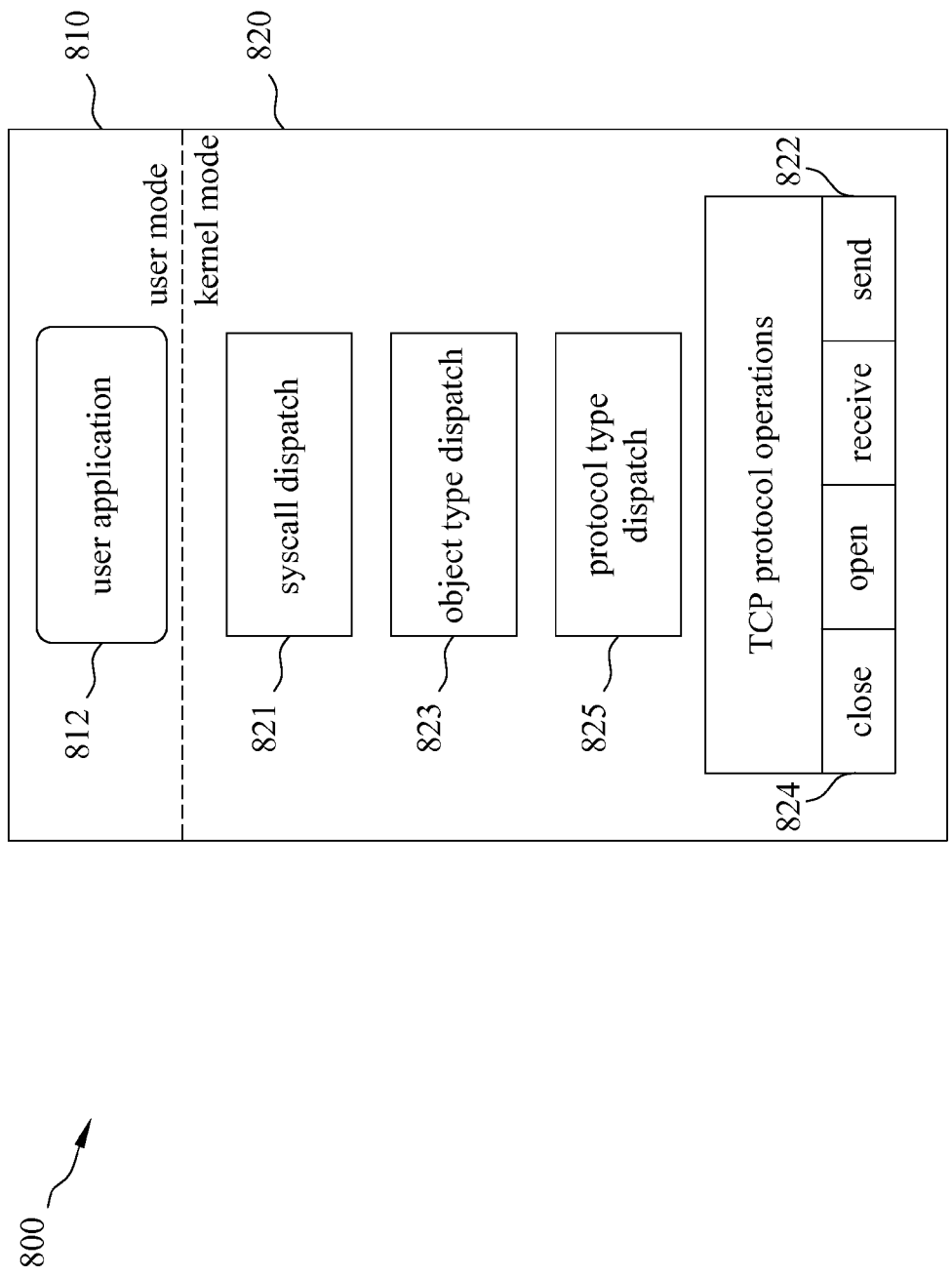
FIG. 8 shows a schematic view of setting hardware breakpoint at TCP protocol's close and send functions, according to an exemplary embodiment.

FIG. 8 shows a schematic view of setting hardware breakpoint at TCP protocol stack's close( ) and send( ) functions, according to an exemplary embodiment. Referring to FIG. 8, a guest VM 800 may provide dispatch functions such as syscall dispatch 821, object type dispatch 823 and protocol type dispatch 825, in the kernel mode 820. Syscall dispatch 821 is a dispatch function based on system call number. Object type dispatch 823 is a dispatch function based on file descriptor object's file system type such as socket, file, proc, etc. Protocol type dispatch 825 is a dispatch function based on socket's protocol type such as TCP, UDP, MCAST, etc. The user application 812 is running in user mode 810 of the guest VM 800. It may call various system calls to send TCP traffic. For example, many system calls use the TCP socket file descriptor as parameter may send packet into the TCP connections, such as send( ), sendto( ), write( ), and sendmsg( ). These system calls all indirectly call a kernel function named tcp_sendmsg( ) of Linux kernel TCP protocol stack.

One instance may enable a hardware debug breakpoint at this tcp_sendmsg( ) function. When VMM gets a VM_exit event due to this hardware breakpoint at tcp_sendmsg( ) function, it successfully intercepts the TCP send related system calls and begins to perform traffic collect in the next step. Thereby, the exemplary embodiments may break the guest OS's TCP protocol operations at send 822 to generate log of thread sending packet to TCP connection, and break the guest OS's TCP protocol operations at close 824 to generate log of thread closing TCP connection. Therefore, intercepting by hardware breakpoint may be performed by setting hardware breakpoint such as at TCP protocol's close( ) and send( ) functions.

Figure 9:
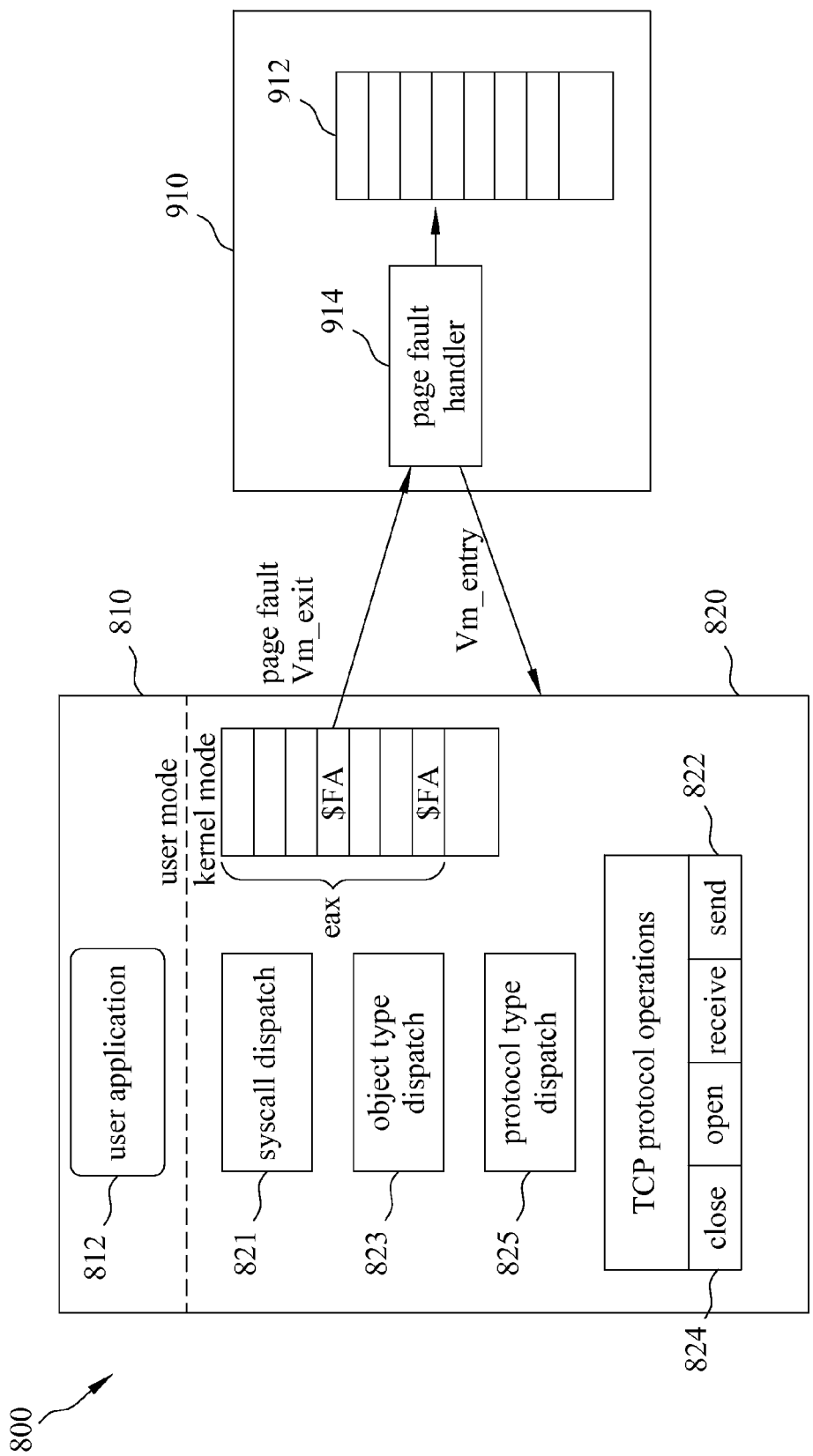
FIG. 9 shows a schematic view to intercept TCP related system calls by cloning a shadow SDT table in a VMM, according to an exemplary embodiment.

In the disclosure, these terms "VM", "guest VM" or "guest" are used to represent the same thing. The term "guest" is often used with VMM to emphasis on the fact that many VMs may run on the same physical server and use the resources allocated by VMM, like a guest. FIG. 9 shows a schematic view to intercept TCP related system calls by cloning a shadow SDT table in a VMM, according to an exemplary embodiment. Where, a shadow SDT table is cloned into the VMM and the TCP related system call entries in the guest OS's SDT table is modified to an invalid address. Referring to FIG. 9, while calling a system call, guest VM 800 jumps to the invalid address specified in its SDT table and generates a page fault. The page fault causes a VM_exit with "page fault" as reason, and the page fault handler 914 in the VMM 910 receives this page fault VM_exit event and checks its fault address. If fault address is the invalid address specified in the guest VM's SD table, VMM changes this VM's program counter to addresses stored at the shadow SDT table 912 thus VM may continue its TCP system call operation. Therefore, intercepting TCP related system calls may be implemented by cloning a shadow SDT table in a VMM and modifying such as TCP send and closely-related system call handler in the SDT of VM.

Figure 10:
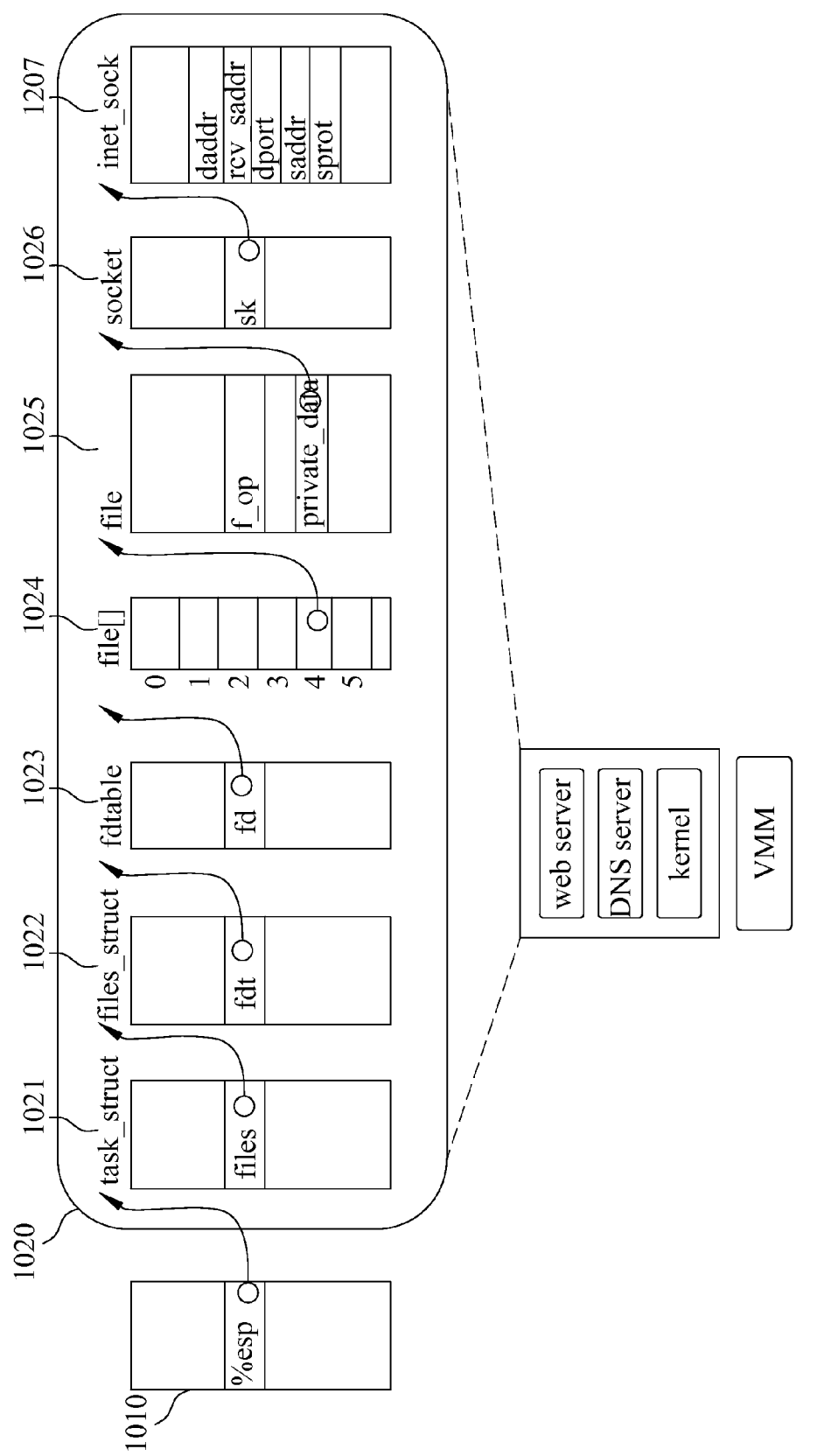
FIG. 10 shows an example that introspects into Linux VM kernel's data structures in a process for running thread and TCP connection information, according to an exemplary embodiment.
Figure 11:
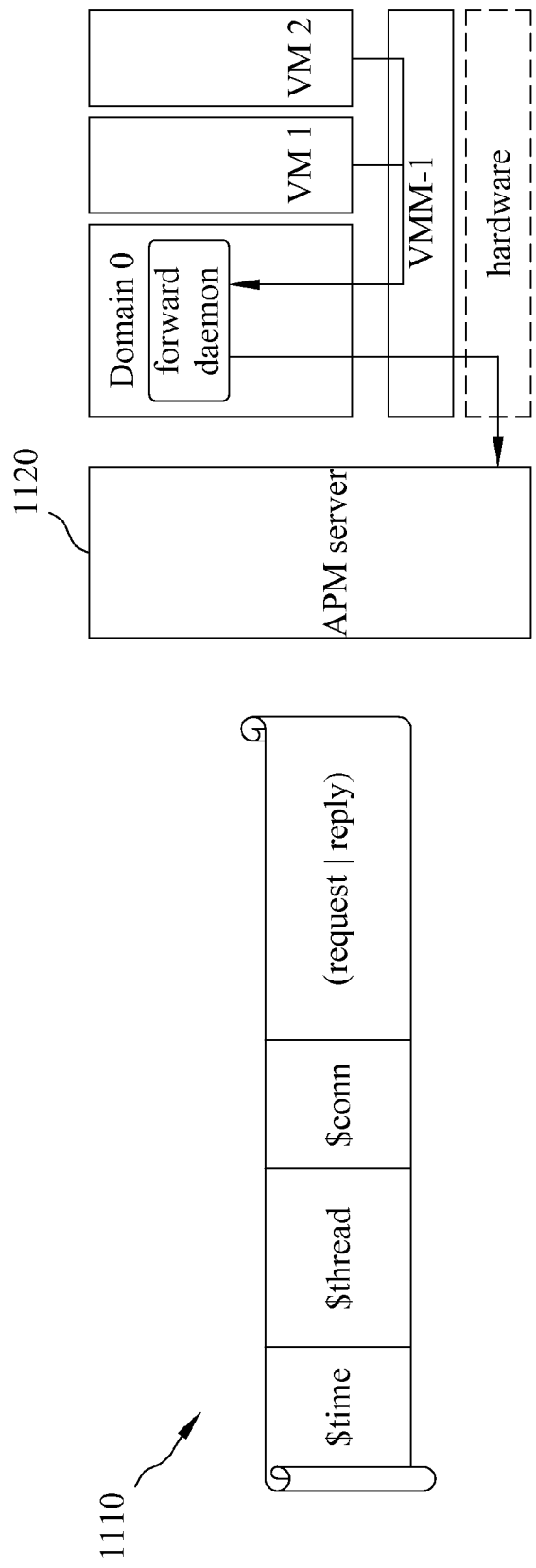
FIG. 11 shows the format of per-thread traffic log, and a log is generated in a VMM and forwarded to an APM server by a forward daemon, according to an exemplary embodiment.

FIG. 10 and FIG. 11 give examples to illustrate the detailed operations of Introspecting 620. Referring to FIG. 10, introspecting references the kernel objects reserved for web server process 1020, including a process object (task_struct 1021), a process's open file descriptors table (files_struct 1022, fdtable 1023, and file[ ] 1024), a file descriptor object (file 1025) and socket objects (socket 1026 and inet_sock 1027). The VMM checks a running VM's virtual CPU's stack pointer register 1010, and masks the stack pointer register's value with 4096 to obtain address of the running thread's task_struct kernel object 1021. The VMM interprets the task_struct object 1021 with knowledge of kernel object definition and obtains current running thread information. As may be seen, the VMM may also get current processing TCP connection information from the parameter list of intercepted function. In one instance of Intel processor, parameters passing at kernel function calls are stored in the CPU register. For intercepting TCP related functions, the address of current processing socket object 1026 is passing in its parameter list. Then TCP connection information may be got by reading address of socket object form the CPU register and interpreting the socket object with kernel object definition. For intercepting TCP related system calls, the file descriptor number is passing in its parameter list. Then TCP connection information may be got by referencing the file descriptor table (1022, 1023 and 1024) in the process, reading address of socket object (1026) in the file descriptor and interpreting socket object with kernel object definition.

Each VMM generates the per-thread traffic log by intercepting and introspecting the guest VM. Then the generated per-thread traffic log is further sent to an APM server. As shown in FIG. 11, the generated per-thread traffic log may be sent to a forward daemon running on a domain 0 for forwarding to the APM server 330. Each generated per-thread traffic log 1110 may contain information such as time information, thread information, connection information, direction (request or reply), etc.

Figure 12:
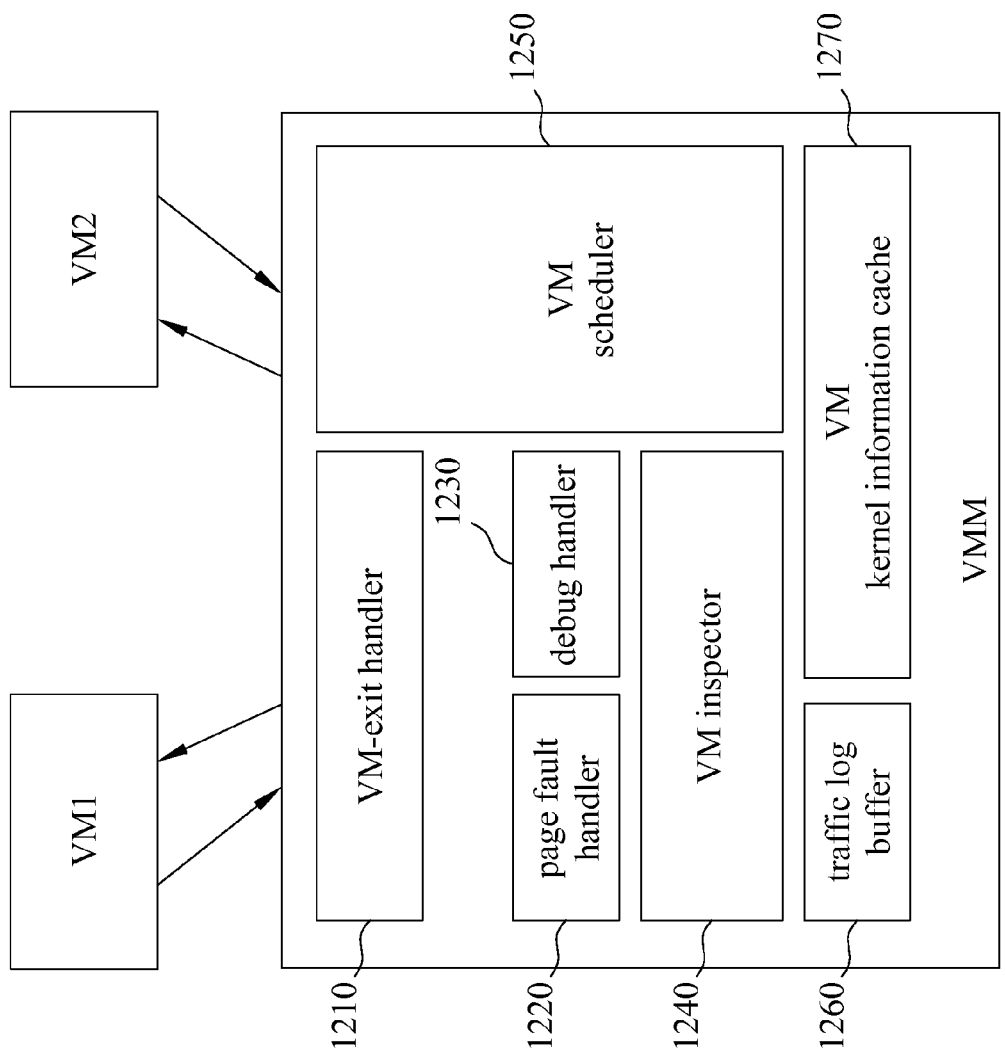
FIG. 12 shows a VMM mechanism to intercept and introspect between multiple guest VMs, according to an exemplary embodiment.

FIG. 12 shows a VMM mechanism to intercept and introspect between multiple guest VMs, according to an exemplary embodiment. Referring to FIG. 12, the VMM mechanism in a VMM may comprise a VM-exit handler 1210 to handle VM exit events, a page fault handler 1220 to handle page-fault vm-exit events, a debug handler 1230 to handle breakpoint vm-exit events, a VM inspector 1240 to perform introspection on VM kernel objects and traffic logs, a VM scheduler 1250 to resume VM execution, a traffic log buffer 1260 to store per-thread traffic logs, and VM kernel information 376 contained in a VM information cache 1270. The VM kernel information contains VM-based interception and introspection information, which at least includes inspect status (such as on or off), method to intercept (such as by hardware interrupt or by shadow SDT table), address of TCP send and closely-related functions, numbers of TCP related system calls, shadow SDT table, and kernel object definition (such as address offset of thread object and socket object). Information for per thread traffic log 1110 may comprises time information, thread information (such as vm id, process id, application name), connection information (such as source IP, source port, destination IP, destination port), and direction (such as request, reply).

When the VMM mechanism applies the hardware interrupt scheme to intercept and introspect between multiple guest VMs such as VM1 and VM2, the VMM mechanism performs two parts. A first part is VM1 hits TCP send and closely-related breakpoints, and a second part is VM1 schedules to VM2. In the first part. VM1 executes the TCP send functions and triggers a VM_exit event by hardware breakpoint. The VM-exit handler 1210 checks the exit reason as "hardware breakpoint" and calls debug handler 1230. The debug handler 1230 checks the break address is at TCP send function and calls VM inspector 1240 to perform introspection. The VM inspector 1240 looks up the kernel object definition from VM information cache 1270 and performs introspect at kernel objects in VM1. After introspecting, the VM inspector 1240 gets the thread and TCP connection information and generates one per thread traffic log and stores it in the traffic log buffer 1260. Then the VM scheduler 1250 resumes VM1's execution.

In the second part, the VM1 exits due to the time slice of VM1 is expired and generates a VM_exit event due to VM reschedules. The scheduler 1250 stores context of running VM (VM1) into a memory and loads context of next VM (VM2) from the memory. As the inspection status and addresses of TCP send related function may not be the same for VM1 and VM2, loading inspection status and configuring hardware breakpoint are also performed before switching to next VM. VM scheduler 1250 reads inspection status of next VM from the VM kernel information 1270. If inspection status of next VM (VM2) is on and the method to intercept is by hardware interrupt (such as 1), VM inspector 1240 reads TCP send related addresses from VM information cache 1270 and sets hardware debug registers.

When the VMM mechanism applies the shadow SDT table scheme to intercept and introspect between multiple guest VMs such as VM1 and VM2, the VMM mechanism performs two parts. A first part is VM1 call TCP send related system calls and a second part is VM1 schedules to VM2. In the first part, VM1 calls a TCP send related system call and triggers a VM_exit event by page fault. The VM-exit handler 1210 checks the exit reason is "page fault" and call page fault handler 1220. The page fault handler checks the fault address is the address specified in SDT table, and calls VM inspector 1240. The VM inspector 1240 looks up the kernel object definition from VM information cache 1270 and performs introspect at kernel objects in VM1. After introspecting, the VM inspector 1240 gets the thread and TCP connection information and generates one per thread traffic log and stores it to traffic log buffer 1260. The VM inspector 1240 also sets a virtual CPU's instruction pointer register to correct system call function's address by looking up the shadow SDT table stored in VM information cache 1270. Then the VM scheduler 1250 resumes VM1's execution. In the second part, VM1 exits due to the time slice for this VM is expired and generates a VM_exit event due to VM reschedules. The scheduler 1250 stores context of running VM (VM1) into a memory and loads context of next VM (VM2). VM scheduler 1250 also reads inspection status from the VM kernel information 1270. If VM2's the inspection status is on, the method is intercepting by shadow SDT table (such as 2) and its shadow SDT table is not existed, the VM inspector clone one shadow SDT table from next VM (VM2) and modifies TCP related system call entries in the SDT table of VM2 to invalid address. VM scheduler 1250 resumes VM2's execution.

Figure 13:
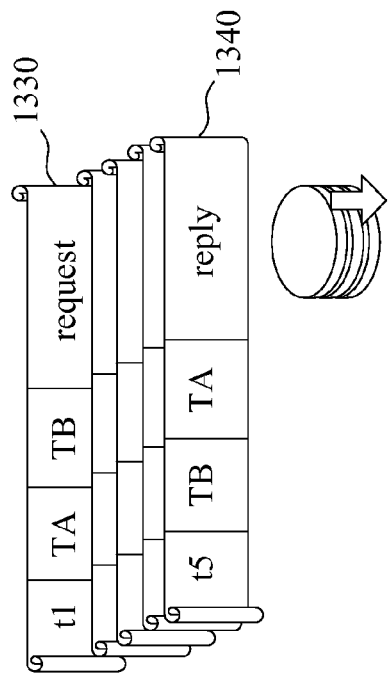
FIG. 13 shows an example of converting per-thread traffic log to inter-thread traffic log and storing in log database, according to an exemplary embodiment.
Figure 13:
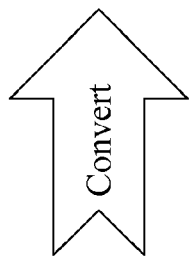
Figure 13:
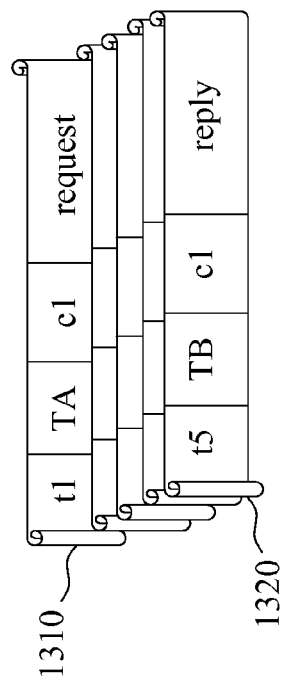

After intercepting 610 and introspecting 620, per-thread traffic log in the APM server 1120 will be converted to an inter-thread traffic log. FIG. 13 shows an example of converting per-thread traffic log to inter-thread traffic log, according to an exemplary embodiment. The APM server 1120 convert each per-thread traffic log into a corresponding inter-process traffic log by finding the destination thread of each per-thread traffic log. As shown in the example of FIG. 13, each per thread-based traffic log is converted to an inter-process traffic log. For example, two per thread-based traffic logs (1310 and 1320) represent two threads TA and TB send to each other through the same TCP connection c. The two per-thread traffic logs are converted to two inter-thread traffic logs (1330 and 1340). The per-thread traffic log 1310 consisting of time (t1), thread information (TA), connection (c1) and direction (request) is converted to the inter-thread traffic log (1330) consisting of time (t1), sender thread information (TA), receiver thread information (TB) and direction (request). Similarly, the per-thread traffic log 1320 consisting of time (t5), thread information (TB), connection (c1) and direction (reply) is converted to the inter-thread traffic log (1340) consisting of time (t5), sender thread information (TB), receiver thread information (TA) and direction (reply). The inter-thread traffic logs may be stored in the APM server's database.

As the generated traffic log records messages exchange between threads, the application generation dependency generation algorithm may use the inter-thread message exchange information to generate the 100% accurate application dependency map for both applications running in multi-process and multi-thread model.

Figure 14:
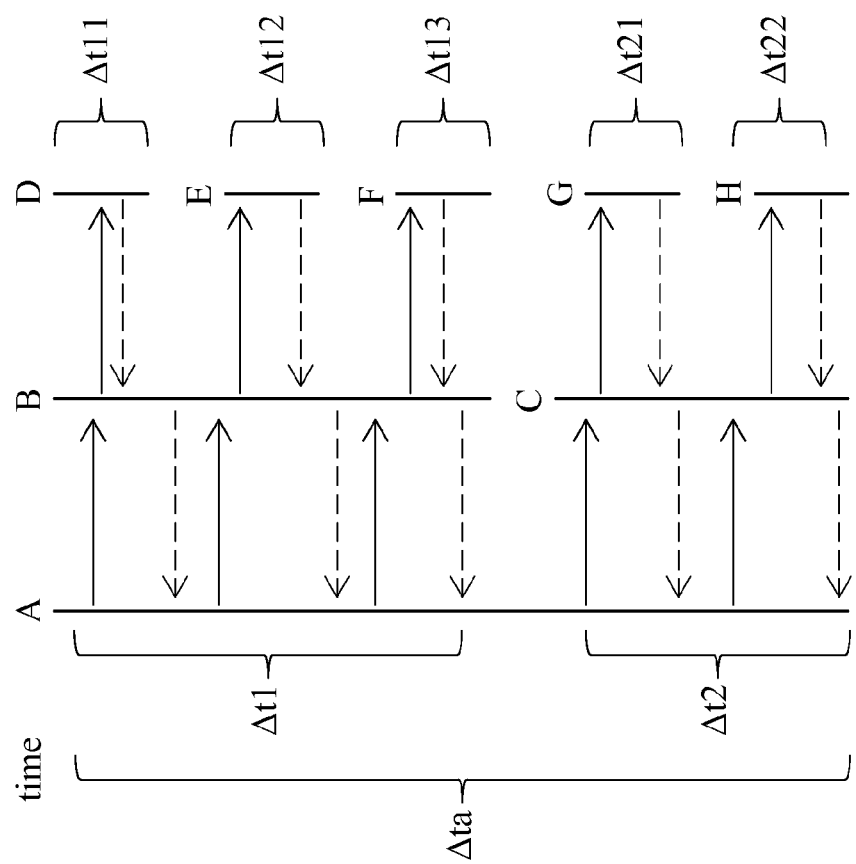
FIG. 14 shows an example of generating an application trajectory, according to an exemplary embodiment.

The design according to the exemplary embodiments to generate trajectory from inter-thread traffic log is using a recursive approach to find out all indirect message exchange between threads during a time period. FIG. 14 shows and example of generating an application trajectory, according to an exemplary embodiment. Referring to FIG. 14, the application trajectory starts from thread A and has message exchanges with thread B and thread C during a time period $\Delta t1$ and a time period $\Delta t2$, respectively. The thread B has message exchanges with thread D, E and F during a time period $\Delta t11$, a time period $\Delta t12$ and a time period $\Delta t13$, respectively. Trajectory of application A during the time period $\Delta ta$ is represented by notation TRA(A,$\Delta ta$), and may further expanded by the following recursive approach.

$$TRA(A,\Delta ta)$$

$$=\{(B,\Delta t1),TRA(B,\Delta t1),(C,\Delta t2),TRA(C,\Delta t2)\} \quad (1)$$

$$=\{(B,\Delta t1),\{(D,\Delta t11),(E,\Delta t12),(F,\Delta t13)\},(C,\Delta t2),TRA(C,\Delta t2)\} \quad (2)$$

$$=\{(B,\Delta t1),\{(D,\Delta t11),(E,\Delta t12),(F,\Delta t13)\},(C,\Delta t2),\{(G,\Delta t21),(H,\Delta t22)\}\} \quad (3)$$

The equation (1) implies the trajectory of application (or thread) A during time period $\Delta ta$ is equivalent to message exchanges with B during time period $\Delta t1$ (denoted by (B, $\Delta t1$)) plus trajectory of thread B during time period $\Delta t1$ (denoted by TRA(B, $\Delta t1$)) and message exchange with thread C during time period $\Delta t2$ (denoted by (C, $\Delta t2$) plus trajectory of thread C during time period $\Delta t2$ (denoted by TRA(C,$\Delta 2$)). Equation (2) may be got by further expanding trajectories of thread B. Equation (3) may be got by further expanding trajectories of thread C. In the equation (3), the trajectory of application A during $\Delta ta$ is message exchanges with applications (or threads) B, D, E, F, C, G and H. The applications (or threads) B and C are directly connected with application A. The applications (or threads) D, E, F, G, and H are indirectly connected with application A.

Figure 15:
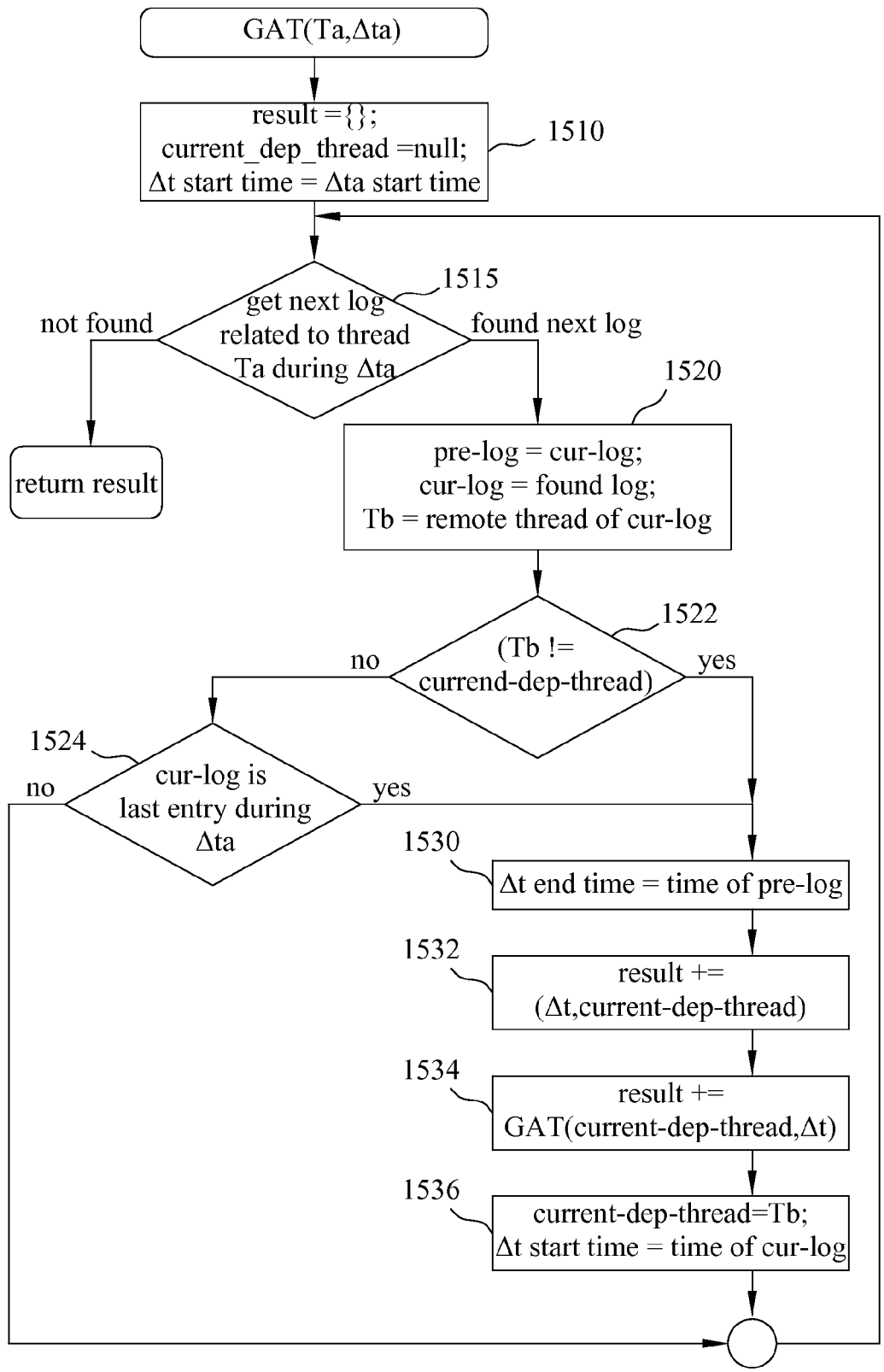
FIG. 15 shows a flow chart illustrating an algorithm of generation an application trajectory for a thread Ta during a time period Δta, according to an exemplary embodiment.

FIG. 15 shows a flow chart illustrating an algorithm of generation application trajectory (GAT) for a thread Ta during a time period $\Delta ta$, according to an exemplary embodiment. The output of the GAT algorithm is an application trajectory stored in a tree data structure. Referring to FIG. 15, the algorithm GAT(Ta,$\Delta ta$) starts with an initialization, including setting an application trajectory to an empty tree (i.e. result= { }), a current dependent thread to null (i.e. current-dep-thread=null), and a start time of $\Delta t$ to the start time of the time period $\Delta ta$ (i.e. start time of $\Delta t$=start time of $\Delta ta$), as shown in step 1510. Then the algorithm GAT(Ta,$\Delta ta$) finds a next traffic log related to thread Ta during $\Delta ta$ (step 1515). When no more next thread traffic log related to thread Ta is found, the algorithm GAT(Ta,$\Delta ta$) returns the result. When such a next traffic log is found, the algorithm GAT(Ta,$\Delta ta$) updates a precious thread traffic log and a current thread traffic (i.e. previous-log=cur-log, current-log=found log), and sets a thread Tb to a remote thread of the current log (i.e. Tb=remote thread of current-log), as shown in step 1520.

When the thread Tb is not the current-dep-thread (step 1522) or the current-log is a last entry during $\Delta ta$ (step 1524), the algorithm GAT(Ta,$\Delta ta$) performs the actions and returns to step 1515; otherwise, it directly returns to step 1515. Where the actions includes setting the end time of $\Delta t$ to the time of previous-log (step 1530), appending one trajectory item (current-dep-thread, $\Delta t$) as child node of the result tree (i.e. result+=(current-dep-thread,$\Delta t$)) (step 1532), recursively calling GAT algorithm to generate an application trajectory tree for the current-dep-thread during $\Delta t$ and adding the generated tree as sub-tree of the result tree (i.e. result+=GAT (current-dep-thread,$\Delta t$)) (step 1534), and setting current-dep-thread to Tb and start time of $\Delta t$ to time of current-log, (i.e. current-dep-thread=Tb and start time of $\Delta t$=time of current-log) (step 1536). As the result, the algorithm GAT(Ta,$\Delta ta$) outputs the application trajectory "result" in the tree data structure.

Figure 16A:
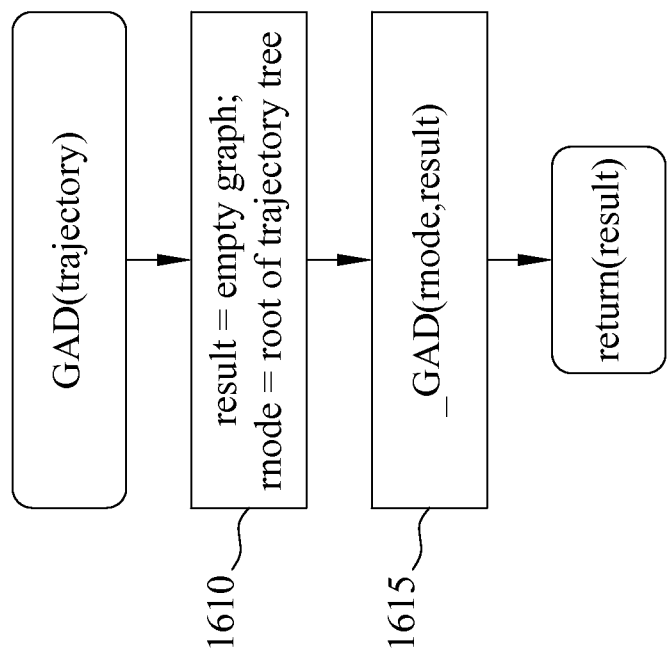
FIG. 16A and FIG. 16B show an operation flow illustrating an algorithm of generation application dependencies (GAD) from an application trajectory, according to an exemplary embodiment.
Figure 16B:
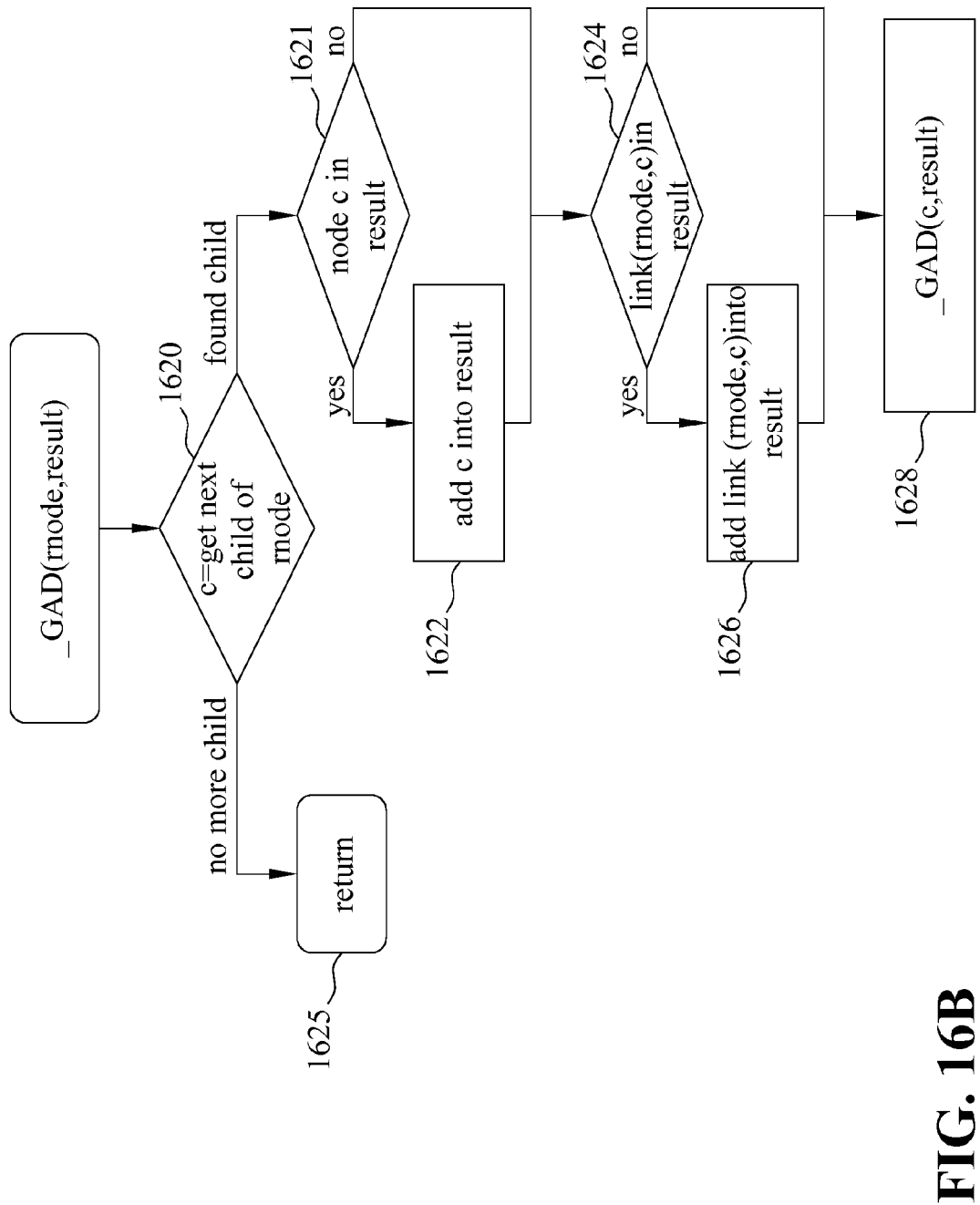

FIG. 16A and FIG. 16B show an operation flow illustrating an algorithm of generation application dependencies (GAD) in a graph data structure from an application trajectory in a tree data structure, according to an exemplary embodiment. Referring to FIG. 16A, the GAD algorithm starts with an initialization, including setting an application dependency map to an empty graph (i.e. result=empty graph), and a root node to the root of a trajectory tree (i.e. mode=root of trajectory tree), as shown in step 1610. Then, the GAD algorithm generates an application dependency map (i.e. result) by recursively calling a function _GAD (step 1615). FIG. 16B show a flow chart illustrating the operations of function _ GAD(rnode, result), according to an exemplary embodiment.

Referring to FIG. 16B, the function _GAD(rnode, result) has two parameters. One is mode and the other is result. The mode parameter is a node in a tree data structure that represents a sub-tree in the application trajectory. The result parameter is a graph data structure that stores application dependency map generated during the recursive calls to _ GAD function. The _GAD function starts with getting a next child of the root node in trajectory, i.e. c=get next child of mode, (step 1620). If no such a child of mode is found, then goes to step 1625. If such a child of mode is found, then goes to step 1621. If node c is not included in the result graph data structure (step 1621), then adds node c into the result graph (step 1622). As mode and c are both in the result graph data structure now, if link from mode to c is not included in the result graph data structure, adds link (mode, c) into the result graph data structure (step 1626). In step 1628, recursively calls the _GAD function with (c, result) as two new parameters to generate remaining dependencies.

As may be seen from FIG. 16A and FIG. 16B, the GAD algorithm is performed by generating an application dependency map from an application trajectory, and recursively calling a _GAD function until no more next child of the mode is found. In other words, the application dependency algorithm is using a recursive approach to find out all indirect dependent threads related to the selected application during a time period. Output of the GAD algorithm is an application dependency map. The map may be represented in a graph data structure.

The generated dependency map may be displayed such as on a graphic user interface (GUI) to help such as administrator to understand software deployment, locate failure thread, locate performance bottleneck, etc. The generated map may also be analyzed to automatically find out the root cause of performance problems in distributed applications.

As mentioned earlier, the exemplary embodiments use a three-phase scheme to reduce cost of traffic log collection and dependencies generation. Cost for the dependencies and collection may include such as inspecting TCP operations by the VMM, transferring log entry to the APM server, storing log entry into the APM server's log database, etc. The cost for inspecting TCP operations by the VMM may include such as the context switch from VM to VMM, performing introspecting into kernel object, the context switch to resume original VM execution, etc. The cost for transferring log entry to the APM server may include such as the VMM sends log entries to a forward daemon at domain 0 by a channel, and the forward daemon sends log entries to the APM server by TCP connection, etc.

Figure 17:
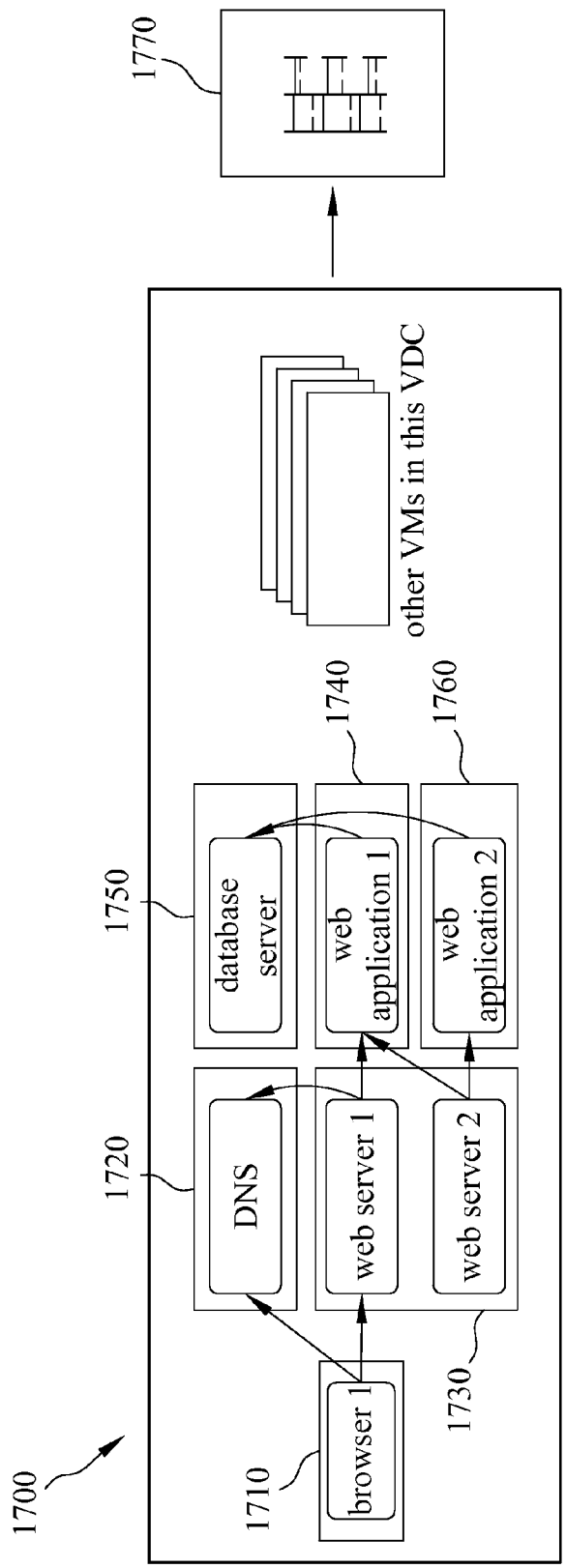
FIG. 17 shows an example illustrating the incremental enabling traffic logging in a VDC in the learning phase, according to an exemplary embodiment.

In the learning phase, the step of incremental enabling 650 identifies VM related to the selected application 414 to generate dependencies. In other words, only related VMs are selected and enabled VM inspection in next phases, thereby reducing the number of VMs needed to inspect. The exemplary embodiments use incremental enabling 650 to enable related VM's inspection feature until no new related VM was found. As mentioned in FIG. 6, incremental enabling 650 incrementally enables VM traffic logging by using the inter-thread traffic log 435 from the traffic log conversion 630, and outputs a related vm-id list 416 to the intercept 610. FIG. 17 shows an example illustrating the incremental enabling traffic logging in a VDC 1700 in the learning phase, according to an exemplary embodiment.

In the example of FIG. 17, initially, an application (browser 1) in VM 1710 is selected to generate dependencies, and starts the learning phase. At the $1^{st}$-time enabling, VM 1720 containing the application DNS (dependent of the application browser 1) is identified. At the $2^{nd}$-time enabling, VM 1730 containing the application web server 1 (dependent of the application browser 1) is identified. At the $3^{rd}$-time enabling, VM 1740 containing the application web application 1 and VM 1760 containing the application web application 2 (dependent of the application web server 1) are identified. At the $4^{th}$-time enabling, VM 1750 containing the application database server (dependent of the application web application 1) is identified. Therefore, the output related VM-id list may include VM 1710, VM 1720, VM 1730, VM 1740, VM 1750 and VM 1760 after the learning phase. Thereby, only related VMs are selected and enabled VM inspection for the next phase (discovery phase). The discovery phase may start the application (browser 1) again and logs traffic into the APM server. And, in the generation phase, the APM server may execute the dependencies generation algorithm and exports application trajectory and dependencies 1770 via a GUI to such as an administration system or root cause analysis module.

Thus, the exemplary embodiments provide a technique looking into thread-level to generate application-level dependencies in a virtualization environment. The technique adopts VM introspection approach without installing additional software or performing such as port polling activity. It Intercepts at system calls and quickly detect deployment change. It also logs traffic at inter-thread level and generates an application trajectory in thread granularity. From the application trajectory, it generates fully accurate application dependencies by a dependency generation algorithm. The technique runs for both multi-process and multi-thread application.

Although the disclosure has been described with reference to the exemplary embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A system for generating application-level dependencies in one or more virtual machines (VMs), comprising:
    an application performance management (APM) server running on a physical machine, wherein said APM server accepts a request and sends a control command to at least one forward daemon, each of said at least one forward daemon transfers the control command to a corresponding VM manager to turn on at least one inspecting status of at least one VM of said one or more VMs, and said APM server further generates an application trajectory of a selected application and exports application-level dependencies from the application trajectory for said selected application;
    one or more intercepting modules, wherein each intercepting module intercepts a guest operating system (OS) at transmission control protocol (TCP) send and closely-related operations on the at least one related VM; and
    one or more introspecting modules, wherein each introspecting module performs VM introspection for TCP connection and running thread information;
    wherein each intercepting module intercepts either by hardware breakpoint at thread-level or by intercepting TCP-related system calls;
    wherein a decision to select an intercept mechanism depends on a number of hardware debug registers supported by a central processing unit (CPU) and a number of TCP send and closely-related functions; and
    wherein when the number of hardware debug registers supported by a CPU is greater than the number of TCP send and closely-related functions, intercepting by hardware breakpoint is selected as the intercept mechanism.

2. The system as claimed in 1, wherein said each introspecting module performs said VM introspection by checking the guest OS's running kernel data structure, getting one or more running threads and TCP connection information, and generating one or more per-thread traffic logs for sending to said APM server via said forward daemon.

3. The system as claimed in claim 1, wherein said each intercepting module and said each introspecting module are both in a corresponding VM monitor on a corresponding physical server, and a corresponding forward daemon of the at least one forward daemon is running on said corresponding physical server.

4. The system as claimed in claim 2, wherein said APM server further comprises:
    a traffic log conversion module for converting the one or more per-thread traffic logs to one or more inter-thread traffic logs; and
    a dependency map generating module for generating said application trajectory from the one or more inter-thread traffic logs and exporting the application dependencies from the application trajectory for the selected application.

5. The system as claimed in claim 4, said system uses a log database to store the one or more inter-thread traffic logs.

6. The system as claimed in claim 1, wherein each of the one or more per-thread traffic logs contains time information, thread information, connection information and direction.

7. The system as claimed in claim 4, wherein each of the one or more inter-thread traffic logs contains time information, sender thread information, receiver thread information and direction.

8. The system as claimed in claim 1, wherein said application trajectory records message exchanges and time periods between applications that starting from one application.

9. The system as claimed in claim 1, wherein said application trajectory is stored in a tree data structure starting from a root node, and comprises one or more nodes, one or more links and one or more arrows, a node in the application trajectory indicates a message exchange to an application during a time period, a link in the application trajectory indicates a direct message exchange between two applications, an arrow in the trajectory indicates the direction of a connection between two applications.

10. The system as claimed in claim 1, wherein said application dependencies include an application dependency map represented in a tree data structure.

11. The system as claimed in claim 1, wherein said APM server uses an incremental enable module to gradually enable a related VM's inspect status until the at least one related VM's inspect status is turned on.

12. A computer-implemented method for generating application-level dependencies in one or more virtual machines (VMs), comprising:
under control of one or more physical servers that provide a virtual environment having said one or more VMs, performing the following:
intercepting a guest operating system (OS) at transmission control protocol (TCP) send and closely-related operations of at least one related VM of said one or more VMs;
performing VM introspection for TCP connection and running thread information;
generating an application trajectory of a selected application and exporting application dependencies from the application trajectory for the selected application; and
implementing the intercepting either by hardware breakpoint at thread-level or by intercepting TCP-related system calls;
wherein a decision to select an intercept mechanism depends on a number of hardware debug registers supported by a central processing unit (CPU) and a number of TCP send and closely-related functions; and
wherein when the number of hardware debug registers supported by a CPU is greater than the number of TCP send and closely-related functions, intercepting by hardware breakpoint is selected as the intercept mechanism.

13. The computer-implemented method as claimed in claim 12, further comprising performing said VM introspection by checking the guest OS's running threads, getting one or more running threads and TCP connection information, and generating one or more per-thread traffic logs.

14. The computer-implemented method as claimed in claim 13, further comprising converting the one or more per-thread traffic logs to one or more inter-thread traffic logs.

15. The computer-implemented method as claimed in claim 14, further comprising a learning phase, a discovery phase and a generation phase to generate application-level dependencies.

16. The computer-implemented method as claimed in claim 15, further comprising, in the learning phase, using an incremental approach to identify at least one VM related to the selected application, and generating a related vm-id list and providing to the discovery phase.

17. The computer-implemented method as claimed in claim 15, further comprising, in the discovery phase, collecting the one or more per-thread traffic logs, generating the one or more inter-thread traffic logs and providing to the generation phase.

18. The computer-implemented method as claimed in claim 15, further comprising, in the generation phase, generating the application trajectory and generating an application dependency map from the application trajectory by applying an application dependency algorithm.

19. The computer-implemented method as claimed in claim 18, further comprising using a recursive approach by the application dependency algorithm to find out all indirect dependent threads related to the selected application during a time period.

20. The computer-implemented method as claimed in claim 13, wherein each of the one or more per-thread traffic logs comprises time information, thread information, connection information and direction.

21. The computer-implemented method as claimed in claim 14, wherein each of the one or more inter-thread traffic logs comprises time information, sender thread information, receiver thread information and direction.

22. The computer-implemented method as claimed in claim 12, wherein said selected application runs on multi-process models.

23. The computer-implemented method as claimed in claim 12, wherein said selected application runs on multi-thread models.

24. The computer-implemented method as claimed in claim 12, wherein when the number of hardware debug registers supported by a CPU is not greater than the number of TCP send and closely-related functions, intercepting TCP-related system calls is selected, which includes a shadow service descriptor table (SDT) cloned in a VM monitor, and the SDT table is modified to intercept TCP-related system calls.

25. A system for generating application-level dependencies in one or more virtual machines (VMs), comprising:
an application performance management (APM) server running on a physical machine, wherein said APM server accepts a request and sends a control command to at least one forward daemon, each of said at least one forward daemon transfers the control command to a corresponding VM manager to turn on at least one inspecting status of at least one VM of said one or more VMs, and said APM server further generates an application trajectory of a selected application and exports application-level dependencies from the application trajectory for said selected application;
one or more intercepting modules, wherein each intercepting module intercepts a guest operating system (OS) at transmission control protocol (TCP) send and closely-related operations on the at least one related VM; and
one or more introspecting modules, wherein each introspecting module performs VM introspection for TCP connection and running thread information;
wherein each intercepting module intercepts either by hardware breakpoint or by intercepting TCP-related system calls;
wherein a decision to select an intercept mechanism depends on a number of hardware debug registers supported by a central processing unit (CPU) and a number of TCP send and closely-related functions; and
wherein when the number of hardware debug registers supported by a CPU is not greater than the number of TCP send and closely-related functions, intercepting TCP-related system calls is selected as the intercept mechanism, the intercepting TCP-related system calls including cloning a shadow service descriptor table (SDT) in a VM monitor and modifying the SDT to intercept TCP-related system calls.

26. A computer-implemented method for generating application-level dependencies in one or more virtual machines (VMs), comprising:
under control of one or more physical servers that provide a virtual environment having said one or more VMs, performing the following:
intercepting a guest operating system (OS) at transmission control protocol (TCP) send and closely-related operations of at least one related VM of said one or more VMs;

performing VM introspection for TCP connection and running thread information;

generating an application trajectory of a selected application and exporting application dependencies from the application trajectory for the selected application; and implementing the intercepting either by hardware breakpoint or by intercepting TCP-related system calls;

wherein a decision to select an intercept mechanism depends on a number of hardware debug registers supported by a central processing unit (CPU) and a number of TCP send and close related functions; and wherein when the number of hardware debug registers supported by a CPU is not greater than the number of TCP send and closely-related functions, intercepting TCP-related system calls is selected as the intercept mechanism, the intercepting TCP-related system calls including cloning a shadow service descriptor table (SDT) in a VM monitor and modifying the SDT to intercept TCP-related system calls.

* * * * *